(12) United States Patent
Chen et al.

(10) Patent No.: US 11,899,178 B2
(45) Date of Patent: Feb. 13, 2024

(54) OPTICAL IMAGING LENS ASSEMBLY INCLUDING SIX LENSES OF +−+−+− REFRACTIVE POWERS

(71) Applicant: ZHEJIANG SUNNY OPTICS CO., LTD., Zhejiang (CN)

(72) Inventors: Nian Chen, Zhejiang (CN); Qi Wu, Zhejiang (CN); Fujian Dai, Zhejiang (CN); Liefeng Zhao, Zhejiang (CN)

(73) Assignee: ZHEJIANG SUNNY OPTICS CO., LTD., Zhejiang (CN)

( * ) Notice: Subject to any disclaimer, the term of this patent is extended or adjusted under 35 U.S.C. 154(b) by 382 days.

(21) Appl. No.: 17/340,123

(22) Filed: Jun. 7, 2021

(65) Prior Publication Data
US 2022/0011552 A1    Jan. 13, 2022

(30) Foreign Application Priority Data
Jul. 8, 2020    (CN) .......................... 202010650904.4

(51) Int. Cl.
*G02B 13/00*    (2006.01)
*G02B 9/62*    (2006.01)

(52) U.S. Cl.
CPC ........... *G02B 13/0045* (2013.01); *G02B 9/62* (2013.01)

(58) Field of Classification Search
CPC .............................. G02B 13/0045; G02B 9/62
See application file for complete search history.

(56) References Cited

U.S. PATENT DOCUMENTS

2018/0231743 A1    8/2018    Tang et al.
2021/0231920 A1*   7/2021    Chang ..................... G02B 13/14

FOREIGN PATENT DOCUMENTS

CN    110286474 A    9/2019
CN    110456481 A    11/2019

OTHER PUBLICATIONS

The first office action of Indian family application dated Mar. 14, 2022.

* cited by examiner

*Primary Examiner* — Wen Huang
(74) *Attorney, Agent, or Firm* — Gang Yu

(57) ABSTRACT

The disclosure provides an optical imaging lens assembly, which sequentially includes, from an object side to an image side along an optical axis, a first lens with a positive refractive power, a second lens, a third lens with a positive refractive power, a fourth lens, a fifth lens with a positive refractive power and a sixth lens with a negative refractive power, wherein a total effective focal length f of the optical imaging lens assembly and an entrance pupil diameter (EPD) of the optical imaging lens assembly meet f/EPD<1.35; and an effective focal length f3 of the third lens, an effective focal length f5 of the fifth lens and an effective focal length f1 of the first lens meet 0.9<(f3+f5)/f1<1.7.

12 Claims, 15 Drawing Sheets

OPTICAL IMAGING LENS ASSEMBLY INCLUDING SIX LENSES OF +−+−+− REFRACTIVE POWERS

CROSS-REFERENCE TO RELATED APPLICATIONS

The disclosure claims priority to Chinese Patent Application No. 202010650904.4, filed to the National Intellectual Property Administration, PRC (CNIPA) on Jul. 8, 2020, the disclosure of which is hereby incorporated by reference in its entirety.

TECHNICAL FIELD

The disclosure relates to the field of optical elements, and more particularly to an optical imaging lens assembly.

BACKGROUND

With the upgrading and updating of consumer electronic devices such as mobile phones and the development of image software functions and video software functions in consumer electronic products, camera functions of mobile phones have become a field of competition of various mobile phone manufacturers.

Camera modules are usually arranged in portable devices such as mobile phones to endow the mobile phones with camera functions. For example, a multi-camera module including multiple optical imaging lens assemblies may be arranged in a mobile phone. The optical imaging lens assemblies realize different functions and are matched to achieve an expected effect. At present, a manner of matching a high-resolution main camera, an ultra-wide-angle lens and a telephoto lens is usually adopted for a post camera module of a flagship phone to implement high-resolution shooting under each object distance. However, with the constant development of camera functions and diversification of camera requirements, the practicability of a camera module has also become an important part in a camera function. For example, when a portrait is shot, a high-resolution shooting effect is not the most important effect, and it is important to embody a subject that is shot and simultaneously blur other parts, namely acquiring a small depth of field.

For meeting a miniaturization requirement and an imaging requirement, an optical imaging lens assembly capable of considering a small size, an ultra-large aperture and a long focal length is required.

SUMMARY

Some embodiments of the disclosure provide an optical imaging lens assembly applicable to a portable electronic product and capable of at least overcoming or partially overcoming at least one shortcoming in a related art.

The disclosure provides an optical imaging lens assembly, which sequentially includes, from an object side to an image side along an optical axis, a first lens with a positive refractive power, a second lens, a third lens with a positive refractive power, a fourth lens, a fifth lens with a positive refractive power and a sixth lens with a negative refractive power, wherein a total effective focal length f of the optical imaging lens assembly and an entrance pupil diameter (EPD) of the optical imaging lens assembly may meet f/EPD<1.35; and an effective focal length f3 of the third lens, an effective focal length f5 of the fifth lens and an effective focal length f1 of the first lens may meet 0.9<(f3+f5)/f1<1.7.

In an implementation mode, an object-side surface of the first lens to an image-side surface of the sixth lens includes at least one aspheric mirror surface.

In an implementation mode, an effective focal length f4 of the fourth lens, an effective focal length f6 of the sixth lens and an effective focal length f2 of the second lens may meet 0.5<(f4+f6)/f2<1.7.

In an implementation mode, a curvature radius R2 of an image-side surface of the first lens, a curvature radius R1 of the object-side surface of the first lens and the total effective focal length f of the optical imaging lens assembly may meet 0.6<(R2−R1)/f<1.3.

In an implementation mode, a curvature radius R3 of an object-side surface of the second lens and a curvature radius R4 of an image-side surface of the second lens may meet 1.3<R3/R4<1.8.

In an implementation mode, a curvature radius R7 of an object-side surface of the fourth lens and a curvature radius R8 of an image-side surface of the fourth lens may meet 2.6<(R7+R8)/(R7−R8)<5.0.

In an implementation mode, a center thickness CT4 of the fourth lens on the optical axis, a spacing distance T45 of the fourth lens and the fifth lens on the optical axis, a center thickness CT5 of the fifth lens on the optical axis and a spacing distance T56 of the fifth lens and the sixth lens on the optical axis may meet 1.0<(CT4+T45)/(CT5+T56)<1.5.

In an implementation mode, an effective radius DT11 of an object-side surface of the first lens and an effective radius DT31 of an object-side surface of the third lens may meet 1.2<DT11/DT31<1.5.

In an implementation mode, an effective radius DT12 of an image-side surface of the first lens, an effective radius DT61 of an object-side surface of the sixth lens and an effective radius DT62 of an image-side surface of the sixth lens may meet 0.6<DT12/(DT61+DT62)<0.9.

In an implementation mode, a center thickness CT1 of the first lens on the optical axis, a center thickness CT2 of the second lens on the optical axis and a center thickness CT3 of the third lens on the optical axis may meet 0.6<CT1/(CT2+CT3)<1.2.

In an implementation mode, TTL is a distance from an object-side surface of the first lens to an imaging surface on the optical axis, a combined focal length f23 of the second lens and the third lens and TTL may meet 0.8<f23/TTL<3.1.

In an implementation mode, SAG22 is an on-axis distance from an intersection point of an image-side surface of the second lens and the optical axis to an effective radius vertex of the image-side surface of the second lens, and SAG31 is an on-axis distance from an intersection point of an object-side surface of the third lens and the optical axis to an effective radius vertex of the object-side surface of the third lens, SAG22 and SAG31 may meet 0.9<SAG22/SAG31<1.3.

In an implementation mode, SAG41 is an on-axis distance from an intersection point of an object-side surface of the fourth lens and the optical axis to an effective radius vertex of the object-side surface of the fourth lens, and SAG61 is an on-axis distance from an intersection point of an object-side surface of the sixth lens and the optical axis to an effective radius vertex of the object-side surface of the sixth lens, SAG41 and SAG61 may meet −1.9<SAG41/SAG61<−0.7.

Another embodiment of the disclosure provides an optical imaging lens assembly, which sequentially includes, from an object side to an image side along an optical axis, a first lens with a positive refractive power, a second lens, a third lens with a positive refractive power, a fourth lens, a fifth lens with a positive refractive power and a sixth lens with a negative refractive power, wherein a total effective focal length f of the optical imaging lens assembly and an EPD of the optical imaging lens assembly may meet f/EPD<1.35; and TTL is a distance from an object-side surface of the first lens to an imaging surface on the optical axis, a combined focal length f23 of the second lens and the third lens and TTL may meet 0.8<f23/TTL<3.1.

In an implementation mode, an effective focal length f4 of the fourth lens, an effective focal length f6 of the sixth lens and an effective focal length f2 of the second lens may meet 0.5<(f4+f6)/f2<1.7.

In an implementation mode, a curvature radius R2 of an image-side surface of the first lens, a curvature radius R1 of the object-side surface of the first lens and a total effective focal length f of the optical imaging lens assembly may meet 0.6<(R2−R1)/f<1.3.

In an implementation mode, an effective focal length f3 of the third lens, an effective focal length f5 of the fifth lens and an effective focal length f1 of the first lens may meet 0.9<(f3+f5)/f1<1.7.

In an implementation mode, a curvature radius R3 of an object-side surface of the second lens and a curvature radius R4 of an image-side surface of the second lens may meet 1.3<R3/R4<1.8.

In an implementation mode, a curvature radius R7 of an object-side surface of the fourth lens and a curvature radius R8 of an image-side surface of the fourth lens may meet 2.6<(R7+R8)/(R7−R8)<5.0.

In an implementation mode, a center thickness CT4 of the fourth lens on the optical axis, a spacing distance T45 of the fourth lens and the fifth lens on the optical axis, a center thickness CT5 of the fifth lens on the optical axis and a spacing distance T56 of the fifth lens and the sixth lens on the optical axis may meet 1.0<(CT4+T45)/(CT5+T56)<1.5.

In an implementation mode, an effective radius DT11 of the object-side surface of the first lens and an effective radius DT31 of an object-side surface of the third lens may meet 1.2<DT11/DT31<1.5.

In an implementation mode, an effective radius DT12 of an image-side surface of the first lens, an effective radius DT61 of an object-side surface of the sixth lens and an effective radius DT62 of an image-side surface of the sixth lens may meet 0.6<DT12/(DT61+DT62)<0.9.

In an implementation mode, a center thickness CT1 of the first lens on the optical axis, a center thickness CT2 of the second lens on the optical axis and a center thickness CT3 of the third lens on the optical axis may meet 0.6<CT1/(CT2+CT3)<1.2.

In an implementation mode, SAG22 is an on-axis distance from an intersection point of an image-side surface of the second lens and the optical axis to an effective radius vertex of an image-side surface of the second lens and SAG31 is an on-axis distance from an intersection point of an object-side surface of the third lens and the optical axis to an effective radius vertex of an object-side surface of the third lens, SAG22 and SAG31 may meet 0.9<SAG22/SAG31<1.3.

In an implementation mode, SAG41 is an on-axis distance from an intersection point of an object-side surface of the fourth lens and the optical axis to an effective radius vertex of an object-side surface of the fourth lens and SAG61 is an on-axis distance from an intersection point of an object-side surface of the sixth lens and the optical axis to an effective radius vertex of an object-side surface of the sixth lens, SAG41 and SAG61 may meet −1.9<SAG41/SAG61<−0.7.

According to the disclosure, six lenses are adopted, and the refractive power and surface types of each lens, the center thickness of each lens, on-axis distances between the lenses and the like are reasonably configured, so that each lens is compact in structure and high in formability. Therefore, at least one beneficial effect of ultra-large aperture, long focal length, low tolerance sensitivity and the like of the optical imaging lens assembly is achieved, and the optical imaging lens assembly is relatively high in practicability.

BRIEF DESCRIPTION OF THE DRAWINGS

Detailed descriptions are made to unrestrictive implementation modes below in combination with the drawings to make the other characteristics, purposes and advantages of the disclosure more apparent. In the drawings.

DETAILED DESCRIPTION OF THE EMBODIMENTS

Figure 1:
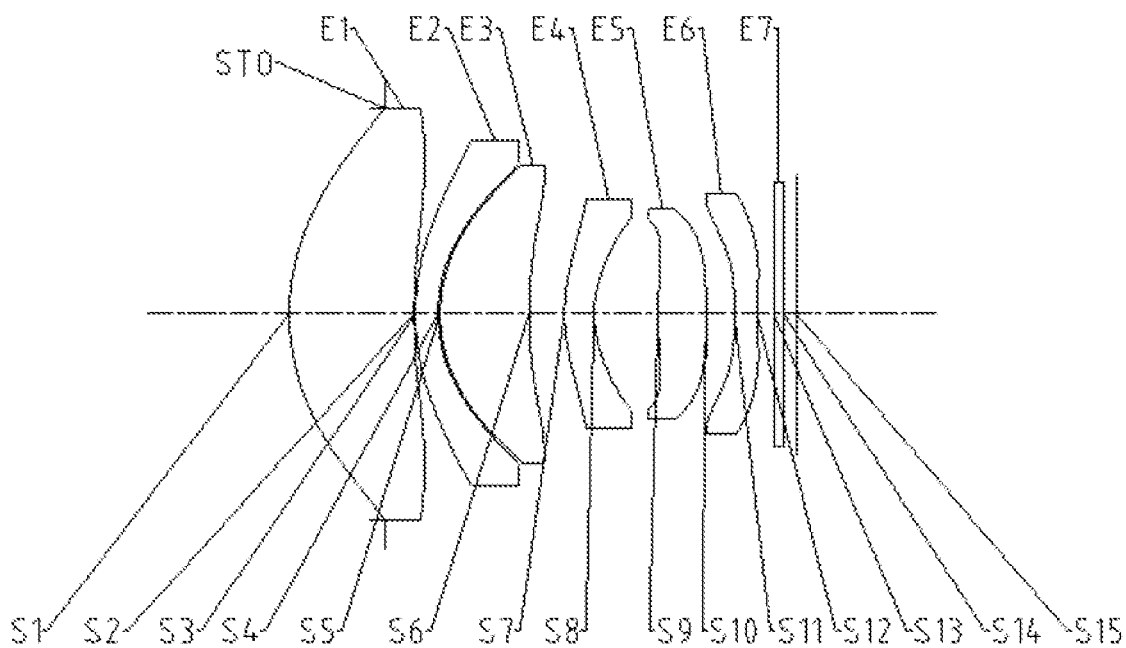
FIG. 1 shows a structure diagram of an optical imaging lens assembly according to embodiment 1 of the disclosure.

For understanding the disclosure better, more detailed descriptions will be made to each aspect of the disclosure with reference to the drawings. It is to be understood that these detailed descriptions are only descriptions about the exemplary implementation modes of the disclosure and not intended to limit the scope of the disclosure in any manner. In the whole specification, the same reference sign numbers represent the same components. Expression "and/or" includes any or all combinations of one or more in associated items that are listed.

It should be noted that, in this description, the expressions of first, second, third, etc. are only used to distinguish one feature from another feature, and do not represent any limitation to the feature. Thus, a first lens discussed below could also be referred to as a second lens or a third lens without departing from the teachings of the disclosure.

In the drawings, the thickness, size and shape of the lens have been slightly exaggerated for ease illustration. In particular, a spherical shape or aspheric shape shown in the drawings is shown by some embodiments. That is, the spherical shape or the aspheric shape is not limited to the spherical shape or aspheric shape shown in the drawings. The drawings are by way of example only and not strictly to scale.

Herein, a paraxial region refers to a region nearby an optical axis. If a lens surface is a convex surface and a position of the convex surface is not defined, it indicates that the lens surface is a convex surface at least in the paraxial region; and if a lens surface is a concave surface and a position of the concave surface is not defined, it indicates that the lens surface is a concave surface at least in the paraxial region. A surface, closest to a shot object, of each lens is called an object-side surface of the lens, and a surface, closest to an imaging surface, of each lens is called an image-side surface of the lens.

It should also be understood that terms "include", "including", "have", "contain" and/or "containing", used in the specification, represent existence of a stated characteristic, component and/or part but do not exclude existence or addition of one or more other characteristics, components and parts and/or combinations thereof. In addition, expressions like "at least one in . . . " may appear after a list of listed characteristics not to modify an individual component in the list but to modify the listed characteristics. Moreover, when the implementation modes of the disclosure are described, "may" is used to represent "one or more implementation modes of the disclosure". Furthermore, term "exemplary" refers to an example or exemplary description.

Unless otherwise defined, all terms (including technical terms and scientific terms) used in the disclosure have the same meanings usually understood by those of ordinary skill in the art of the disclosure. It is also to be understood that the terms (for example, terms defined in a common dictionary) should be explained to have meanings consistent with the meanings in the context of a related art and may not be explained with ideal or excessively formal meanings, unless clearly defined like this in the disclosure.

It is to be noted that the embodiments in the disclosure and characteristics in the embodiments may be combined without conflicts. The disclosure will be described below with reference to the drawings and in combination with the embodiments in detail.

The features, principles and other aspects of the disclosure will be described below in detail.

An optical imaging lens assembly according to an exemplary implementation mode of the disclosure may include, for example, six lenses with refractive power, i.e., a first lens, a second lens, a third lens, a fourth lens, a fifth lens and a sixth lens. The six lenses are sequentially arranged from an object side to an image side along an optical axis. In the first lens to the sixth lens, there may be an air space between any two adjacent lenses.

In the exemplary implementation mode, the first lens has a positive refractive power; the second lens has a positive refractive power or a negative refractive power; the third lens has a positive refractive power; the fourth lens has a positive refractive power or a negative refractive power; the fifth lens has a positive refractive power; and the sixth lens has a negative refractive power. The first lens with the positive refractive power may act to converge light entering the optical imaging lens assembly. The third lens with the positive refractive power may be matched with the two lenses in an object-side direction thereof to eliminate a spherical aberration. The fifth lens with the positive refractive power may be matched with the fourth lens to eliminate a spherical aberration. The sixth lens with the negative refractive power may be matched with the fourth lens and the fifth lens to eliminate astigmatism as well as a distortion.

In the exemplary implementation mode, the optical imaging lens assembly of the disclosure may meet a conditional expression f/EPD<1.35, wherein f is a total effective focal length of the optical imaging lens assembly, and EPD is an entrance pupil diameter of the optical imaging lens assembly. A ratio of the total effective focal length to the EPD may be controlled to control an Fno of the optical imaging lens assembly, namely controlling an aperture of the optical imaging lens assembly. f/EPD<1.35 is met, so that the optical imaging lens assembly has an ultra-large aperture, and acquisition of a high luminous flux by the optical imaging lens assembly is facilitated. In addition, compared with a depth-of-field effect achieved by a focal length feature of the optical imaging lens assembly, a depth-of-field effect achieved by a large aperture is more obvious. Moreover, a telephoto feature of the optical imaging lens assembly is matched based on the ultra-large aperture, so that a smaller depth of field may be acquired to achieve a better blurring effect and further highlight a subject that is shot better. The optical imaging lens assembly provided in the disclosure has a better portrait shooting effect. Furthermore, f and EPD may meet f/EPD<1.31.

In the exemplary implementation mode, the optical imaging lens assembly of the disclosure may meet a conditional expression 0.9<(f3+f5)/f1<1.7, wherein f3 is an effective focal length of the third lens, f5 is an effective focal length of the fifth lens, and f1 is an effective focal length of the first lens. 0.9<(f3+f5)/f1<1.7 is met, so that the refractive power of the first lens, the third lens and the fifth lens may be configured reasonably, reasonable distribution of the refractive power of each lens in the space is facilitated, and reduction of an aberration of the optical imaging lens assembly is also facilitated. Furthermore, f3, f5 and f1 may meet 0.95<(f3+f5)/f1<1.65.

In the exemplary implementation mode, the optical imaging lens assembly of the disclosure may meet a conditional expression 0.5<(f4+f6)/f2<1.7, wherein f4 is an effective focal length of the fourth lens, f6 is an effective focal length of the sixth lens, and f2 is an effective focal length of the second lens. 0.5<(f4+f6)/f2<1.7 is met, so that the refractive power of the second lens, the fourth lens and the sixth lens may be configured reasonably, reasonable distribution of the refractive power of each lens in the space is facilitated, and reduction of the aberration of the optical imaging lens assembly is also facilitated. Furthermore, f4, f6 and f2 may meet 0.55<(f4+f6)/f2<1.65.

In the exemplary implementation mode, the optical imaging lens assembly of the disclosure may meet a conditional expression 0.6<(R2−R1)/f<1.3, wherein R2 is a curvature radius of an image-side surface of the first lens, R1 is a curvature radius of an object-side surface of the first lens, and f is the total effective focal length of the optical imaging lens assembly. Meeting 0.6<(R2−R1)/f<1.3 is favorable for reducing the aberration of the optical imaging lens assembly.

In the exemplary implementation mode, the optical imaging lens assembly of the disclosure may meet a conditional expression 1.3<R3/R4<1.8, wherein R3 is a curvature radius of an object-side surface of the second lens, and R4 is a curvature radius of an image-side surface of the second lens. Controlling a ratio of the curvature radii of the two mirror surfaces of the second lens in this range is favorable for regulating a contribution of the second lens to the aberration of the optical imaging lens assembly reasonably. Furthermore, R3 and R4 may further meet 1.35<R3/R4<1.75.

In the exemplary implementation mode, the optical imaging lens assembly of the disclosure may meet a conditional expression 2.6<(R7+R8)/(R7−R8)<5.0, wherein R7 is a curvature radius of an object-side surface of the fourth lens, and R8 is a curvature radius of an image-side surface of the fourth lens. 2.6<(R7+R8)/(R7−R8)<5.0 is met, so that the curvature radius of an object-side surface of the fourth lens and the curvature radius of the image-side surface of the fourth lens may be controlled, contributions of the object-side surface and image-side surface of the fourth lens to the astigmatism may further be controlled effectively, and furthermore, the image quality of a middle field of view and an aperture band is controlled effectively and reasonably.

In the exemplary implementation mode, the optical imaging lens assembly of the disclosure may meet a conditional expression 1.0<(CT4+T45)/(CT5+T56)<1.5, wherein CT4 is a center thickness of the fourth lens on the optical axis, T45 is a spacing distance of the fourth lens and the fifth lens on the optical axis, CT5 is a center thickness of the fifth lens on the optical axis, and T56 is a spacing distance of the fifth lens and the sixth lens on the optical axis. 1.0<(CT4+T45)/(CT5+T56)<1.5 is met, so that the respective thicknesses of the fourth lens and the fourth lens and air spaces at the image-side surfaces of the two may be controlled, avoidance of the condition that the two lenses are too thick is facilitated, furthermore, influences on a spatial distribution of the lenses are avoided, and the optical imaging lens assembly may be assembled conveniently. Furthermore, CT4, T45, CT5 and T56 may meet 1.15<(CT4+T45)/(CT5+T56)<1.49.

In the exemplary implementation mode, the optical imaging lens assembly of the disclosure may meet a conditional expression 1.2<DT11/DT31<1.5, wherein DT11 is an effective radius of an object-side surface of the first lens, and DT31 is an effective radius of an object-side surface of the third lens. Controlling a ratio of the semi-diameter of the object-side surface of the first lens to the effective radius of an object-side surface of the third lens in this range is favorable for achieving a large image surface and making a size of the optical imaging lens assembly in a radial direction of the optical axis changing more gently. Furthermore, DT11 and DT31 may meet 1.24<DT11/DT31<1.40.

In the exemplary implementation mode, the optical imaging lens assembly of the disclosure may meet a conditional expression 0.6<DT12/(DT61+DT62)<0.9, wherein DT12 is an effective radius of an image-side surface of the first lens, DT61 is an effective radius of an object-side surface of the sixth lens, and DT62 is an effective radius of an image-side surface of the sixth lens. Meeting 0.6<DT12/(DT61+DT62) <0.9 is favorable for making a size distribution of the optical imaging lens assembly in the radial direction of the optical axis more reasonable.

In the exemplary implementation mode, the optical imaging lens assembly of the disclosure may meet a conditional expression 0.6<CT1/(CT2+CT3)<1.2, wherein CT1 is a center thickness of the first lens on the optical axis, CT2 is a center thickness of the second lens on the optical axis, and CT3 is a center thickness of the third lens on the optical axis. 0.6<CT1/(CT2+CT3)<1.2 is met, so that the thicknesses of the three lenses may be controlled to facilitate avoidance of influences of excessively large thicknesses of the lenses on the spatial distribution of the lenses and further facilitate assembling of the optical imaging lens assembly. Furthermore, CT1, CT2 and CT3 may meet 0.67<CT1/(CT2+CT3) <1.13.

In the exemplary implementation mode, the optical imaging lens assembly of the disclosure may meet a conditional expression 0.8<f23/TTL<3.1, wherein f23 is a combined focal length of the second lens and the third lens on the optical axis, and TTL is a distance from the object-side surface of the first lens to an imaging surface on the optical axis. Controlling a ratio of the combined focal length of the second lens and the third lens to a Total Track Length (TTL) is favorable for optimizing an overall spatial structural layout of the optical imaging lens assembly.

In the exemplary implementation mode, the optical imaging lens assembly of the disclosure may meet a conditional expression 0.9<SAG22/SAG31<1.3, wherein SAG22 is an on-axis distance from an intersection point of an image-side surface of the second lens and the optical axis to an effective radius vertex of an image-side surface of the second lens, and SAG31 is an on-axis distance from an intersection point of an object-side surface of the third lens and the optical axis to an effective radius vertex of an object-side surface of the third lens. Controlling a ratio of a vector height of the image-side surface of the second lens to a vector height of the object-side surface of the third lens in this range is favorable for limiting bending degrees of the two lenses and further reducing difficulties in machining and forming of the lenses. Furthermore, SAG22 and SAG31 may meet 0.96<SAG22/SAG31<1.05.

In the exemplary implementation mode, the optical imaging lens assembly of the disclosure may meet a conditional expression −1.9<SAG41/SAG61<−0.7, wherein SAG41 is an on-axis distance from an intersection point of an object-side surface of the fourth lens and the optical axis to an effective radius vertex of an object-side surface of the fourth lens, and SAG61 is an on-axis distance from an intersection point of an object-side surface of the sixth lens and the optical axis to an effective radius vertex of an object-side surface of the sixth lens. Controlling a ratio of a vector height of the object-side surface of the fourth lens to a vector height of the object-side surface of the sixth lens in this range is favorable for limiting bending degrees of the two lenses and further reducing difficulties in machining and forming of the lenses. Furthermore, SAG41 and SAG61 may meet −1.84<SAG41/SAG61<−0.76.

In the exemplary implementation mode, the optical imaging lens assembly may further include at least one diaphragm. The diaphragm may be arranged at a proper position as required, for example, arranged between the object side and the first lens. Optionally, the optical imaging lens assembly may further include an optical filter configured to correct a chromatic aberration and/or protective glass configured to protect a photosensitive element on the imaging surface.

The optical imaging lens assembly according to the implementation mode of the disclosure may adopt multiple lenses, for example, the abovementioned six. The refractive power and surface types of each lens, a center thickness of each lens, on-axis distances between the lenses and the like are reasonably configured to effectively reduce the size of the imaging lens, reduce the sensitivity of the imaging lens, improve the machinability of the imaging lens and ensure that the optical imaging lens assembly is more favorable for production and machining and applicable to a portable electronic product. In addition, the optical imaging lens assembly of the disclosure also has high optical performance such as an ultra-large aperture and a long focal length. A magnitude of a depth of field of the optical imaging lens assembly is related to the Fno, the focal length and the like. If the Fno is smaller (the aperture is larger), the depth of field is smaller, and if the focal length is larger, the depth of field is smaller. Based on this, the optical imaging lens assembly with a large aperture and a long focal length in the disclosure may acquire a smaller depth of field to achieve a better blurring effect, namely having a better portrait shooting effect.

In the implementation mode of the disclosure, at least one of mirror surfaces of each lens is an aspheric mirror surface, namely at least one of the object-side surface of the first lens to an image-side surface of the sixth lens is an aspheric mirror surface. An aspheric lens has a characteristic that a curvature keeps changing from a center of the lens to a periphery of the lens. Unlike a spherical lens with a constant curvature from a center of the lens to a periphery of the lens, the aspheric lens has a better curvature radius characteristic and the advantages of improving distortions and improving astigmatic aberrations. With adoption of the aspheric lens, astigmatic aberrations during imaging may be eliminated as much as possible, thereby improving the imaging quality. Optionally, at least one of the object-side surface and image-side surface of each lens in the first lens, the second lens, the third lens, the fourth lens, the fifth lens and the sixth lens is an aspheric mirror surface. Optionally, both the object-side surface and image-side surface of each lens in the first lens, the second lens, the third lens, the fourth lens, the fifth lens and the sixth lens are aspheric mirror surfaces.

However, those skilled in the art should know that the number of the lenses forming the optical imaging lens assembly may be changed without departing from the technical solutions claimed in the disclosure to achieve each result and advantage described in the specification. For example, although descriptions are made in the implementation with six lenses as an example, the optical imaging lens assembly is not limited to six lenses. If necessary, the optical imaging lens assembly may further include another number of lenses.

Specific embodiments of the optical imaging lens assembly applied to the abovementioned implementation mode will further be described below with reference to the drawings.

Embodiment 1

An optical imaging lens assembly according to embodiment 1 of the disclosure will be described below with reference to FIG. 1 to FIG. 2D. FIG. 1 shows a structure diagram of an optical imaging lens assembly according to embodiment 1 of the disclosure.

As shown in FIG. 1, the optical imaging lens assembly sequentially includes, from an object side to an image side along an optical axis, a diaphragm STO, a first lens E1, a second lens E2, a third lens E3, a fourth lens E4, a fifth lens E5, a sixth lens E6 and an optical filter E7.

The first lens E1 has a positive refractive power, an object-side surface S1 thereof is a convex surface, while an image-side surface S2 is a concave surface. The second lens E2 has a negative refractive power, an object-side surface S3 thereof is a convex surface, while an image-side surface S4 is a concave surface. The third lens E3 has a positive refractive power, an object-side surface S5 thereof is a convex surface, while an image-side surface S6 is a concave surface. The fourth lens E4 has a negative refractive power, an object-side surface S7 thereof is a convex surface, while an image-side surface S8 is a concave surface. The fifth lens E5 has a positive refractive power, an object-side surface S9 thereof is a convex surface, while an image-side surface S10 is a convex surface. The sixth lens E6 has a negative refractive power, an object-side surface S11 thereof is a convex surface, while an image-side surface S12 is a concave surface. The optical filter E7 has an object-side surface S13 and an image-side surface S14. The optical imaging lens assembly has an imaging surface S15. Light from an object sequentially penetrates through each of the surfaces S1 to S14 and is finally imaged on the imaging surface S15.

Table 1 shows a basic parameter table of the optical imaging lens assembly of embodiment 1, and units of the curvature radius, the thickness/distance and the focal length are all millimeter (mm).

TABLE 1

| Surface number | Surface type | Curvature radius | Thickness/ distance | Refractive index | Abbe number | Focal length | Conic coefficient |
|---|---|---|---|---|---|---|---|
| OBJ | Spherical | Infinite | Infinite | | | | |
| STO | Spherical | Infinite | −2.0109 | | | | |
| S1 | Aspheric | 4.7532 | 2.6400 | 1.54 | 56.1 | 11.44 | 0.0000 |
| S2 | Aspheric | 16.0283 | 0.0300 | | | | 0.0000 |
| S3 | Aspheric | 6.1204 | 0.4800 | 1.68 | 19.2 | −13.25 | 0.0000 |
| S4 | Aspheric | 3.5243 | 0.0400 | | | | 0.0000 |
| S5 | Aspheric | 3.3351 | 1.8800 | 1.54 | 56.1 | 8.73 | 0.0000 |
| S6 | Aspheric | 8.9085 | 0.7464 | | | | 0.0000 |
| S7 | Aspheric | 3.5407 | 0.6300 | 1.67 | 20.4 | −13.26 | 0.0000 |
| S8 | Aspheric | 2.3488 | 1.3514 | | | | 0.0000 |
| S9 | Aspheric | 9.9404 | 1.0200 | 1.68 | 19.2 | 9.63 | 0.0000 |
| S10 | Aspheric | −18.2229 | 0.5915 | | | | 0.0000 |
| S11 | Aspheric | 185.3689 | 0.4800 | 1.68 | 19.2 | −7.95 | 0.0000 |
| S12 | Aspheric | 5.2262 | 0.3533 | | | | 0.0000 |
| S13 | Spherical | Infinite | 0.2100 | 1.52 | 64.2 | | |
| S14 | Spherical | Infinite | 0.2673 | | | | |
| S15 | Spherical | Infinite | | | | | |

In embodiment 1, a value of a total effective focal length f of the optical imaging lens assembly is 8.95 mm, TTL is an on-axis distance from the object-side surface S1 of the first lens E1 to the imaging surface S15, a value of TTL is 10.72 mm, and a value of ImgH (ImgH is a half of a diagonal length of an effective pixel region on the imaging surface S15) is 2.65 mm.

In embodiment 1, both the object-side surface and image-side surface of any lens in the first lens E1 to the sixth lens E6 are aspheric surfaces, and a surface type of each aspheric lens may be defined through, but not limited to, the following aspheric surface formula:

$$x = \frac{ch^2}{1 + \sqrt{1 - (k+1)c^2h^2}} + \sum A_i h^i, \qquad (1)$$

wherein x is a distance vector height of a distance between the aspheric surface and a vertex of the aspheric surface when the aspheric surface is located at a position with the height h along the optical axis direction, c=1/R (namely, the paraxial curvature c is a reciprocal of the curvature radius R in Table 1 above); k is a cone coefficient; and Ai is a correction coefficient of the i-th order of the aspheric surface. Table 2 shows high-order coefficients A4, A6, A8, A10, A12, A14, A16, A18 and A20 that can be used for each of aspheric mirror surfaces S1 and S12 in embodiment 1.

Figure 2A:
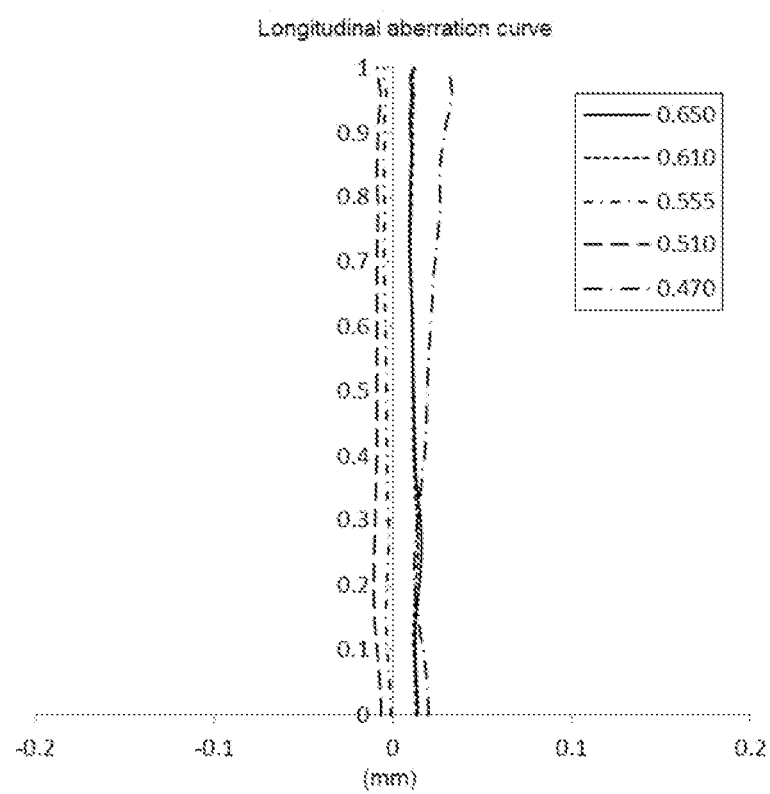
FIG. 2A to FIG. 2D show a longitudinal aberration curve, an astigmatism curve, a distortion curve and a lateral color curve of an optical imaging lens assembly according to embodiment 1 respectively.
Figure 2B:
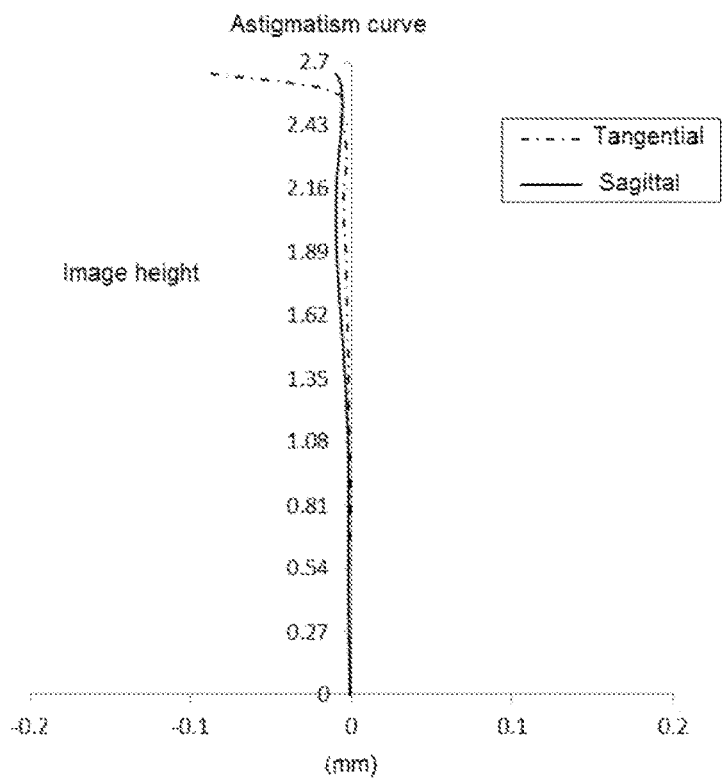
Figure 2C:
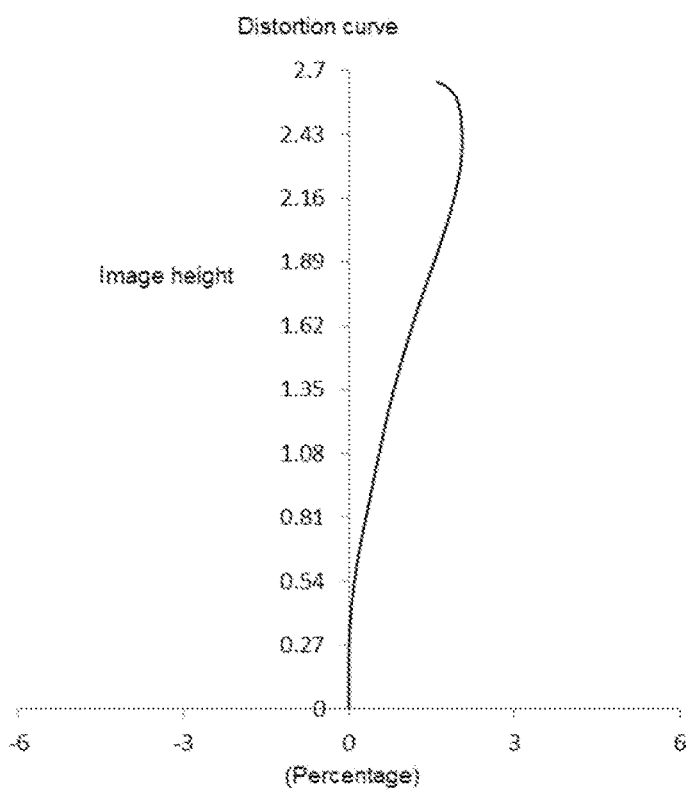
Figure 2D:
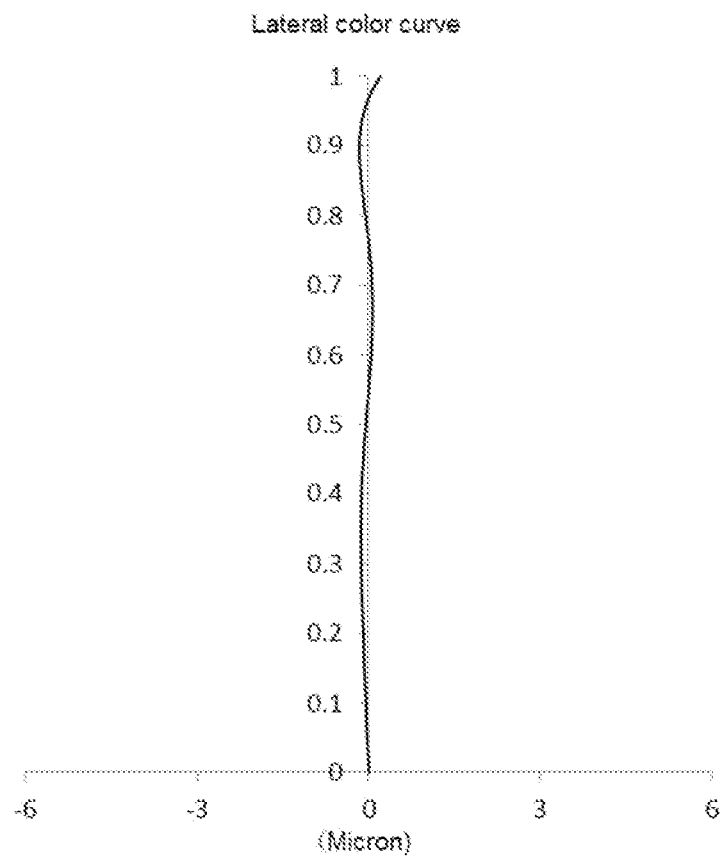

FIG. 2A shows a longitudinal aberration curve of the optical imaging lens assembly according to embodiment 1 to represent deviation of a convergence focal point after light with different wavelengths passes through the lens. FIG. 2B shows an astigmatism curve of the optical imaging lens assembly according to embodiment 1 to represent a tangential image surface curvature and a sagittal image surface curvature. FIG. 2C shows a distortion curve of the optical imaging lens assembly according to embodiment 1 to represent distortion values corresponding to different image heights. FIG. 2D shows a lateral color curve of the optical imaging lens assembly according to embodiment 1 to represent deviation of different image heights on the imaging surface after the light passes through the lens. According to FIG. 2A to FIG. 2D, it can be seen that the optical imaging lens assembly provided in embodiment 1 may achieve high imaging quality.

Embodiment 2

Figure 3:
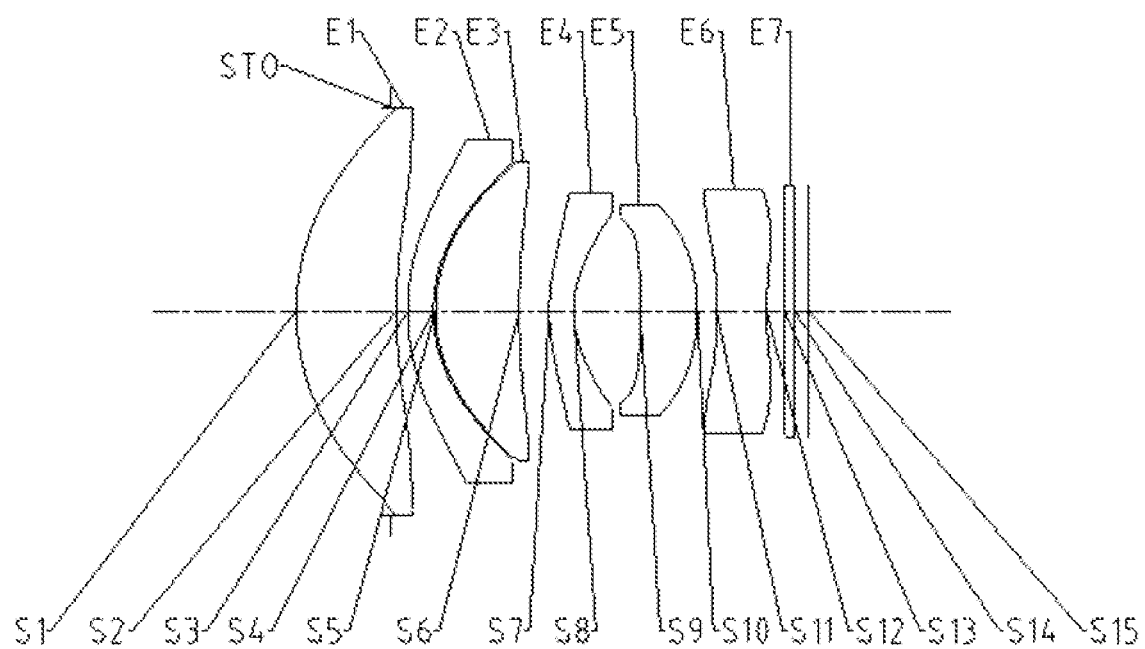
FIG. 3 shows a structure diagram of an optical imaging lens assembly according to embodiment 2 of the disclosure.

An optical imaging lens assembly according to embodiment 2 of the disclosure will be described below with reference to FIG. 3 to FIG. 4D. In the embodiment and the following embodiments, part of descriptions similar to those about embodiment is omitted for simplicity. FIG. 3 shows a structure diagram of an optical imaging lens assembly according to embodiment 2 of the disclosure.

As shown in FIG. 3, the optical imaging lens assembly sequentially includes, from an object side to an image side along an optical axis, a diaphragm STO, a first lens E1, a second lens E2, a third lens E3, a fourth lens E4, a fifth lens E5, a sixth lens E6 and an optical filter E7.

The first lens E1 has a positive refractive power, an object-side surface S1 thereof is a convex surface, while an image-side surface S2 is a concave surface. The second lens E2 has a negative refractive power, an object-side surface S3 thereof is a convex surface, while an image-side surface S4 is a concave surface. The third lens E3 has a positive refractive power, an object-side surface S5 thereof is a convex surface, while an image-side surface S6 is a concave surface. The fourth lens E4 has a negative refractive power, an object-side surface S7 thereof is a convex surface, while an image-side surface S8 is a concave surface. The fifth lens E5 has a positive refractive power, an object-side surface S9 thereof is a concave surface, while an image-side surface S10 is a convex surface. The sixth lens E6 has a negative refractive power, an object-side surface S11 thereof is a concave surface, while an image-side surface S12 is a concave surface. The optical filter E7 has an object-side surface S13 and an image-side surface S14. The optical

TABLE 2

| Surface number | A4 | A6 | A8 | A10 | A12 |
|---|---|---|---|---|---|
| S1 | −6.2388E−04 | −4.3523E−05 | 2.2274E−05 | −1.0937E−05 | 3.3736E−06 |
| S2 | 6.3655E−03 | 1.6412E−03 | −3.6044E−03 | 1.7680E−03 | −4.9420E−04 |
| S3 | 9.5039E−03 | 7.1576E−04 | −8.7971E−04 | −7.5844E−04 | 7.1532E−04 |
| S4 | 9.1307E−03 | −1.0449E−02 | 2.3881E−02 | −2.3506E−02 | 1.2367E−02 |
| S5 | 5.4758E−03 | −1.2237E−02 | 2.6095E−02 | −2.5008E−02 | 1.3195E−02 |
| S6 | −3.5589E−03 | 1.6577E−03 | −7.5379E−04 | 6.2663E−04 | −5.1820E−04 |
| S7 | −2.0915E−02 | 2.5407E−03 | −1.0560E−03 | 2.3417E−03 | −3.4593E−03 |
| S8 | −2.5525E−02 | 7.9232E−04 | 9.0279E−03 | −2.8793E−02 | 5.5399E−02 |
| S9 | −9.8748E−03 | 1.6074E−03 | −1.3019E−02 | 3.4467E−02 | −5.9439E−02 |
| S10 | −2.2533E−02 | 5.0677E−03 | 9.8113E−04 | −9.1234E−03 | 1.3421E−02 |
| S11 | −9.5199E−03 | 3.7466E−02 | −1.3120E−02 | 8.3415E−03 | −1.0387E−02 |
| S12 | −1.0314E−01 | 6.5606E−02 | −6.5346E−02 | 6.5795E−02 | −5.1769E−02 |

| Surface number | A14 | A16 | A18 | A20 |
|---|---|---|---|---|
| S1 | −7.6249E−07 | 1.2644E−07 | −1.5266E−08 | 1.3267E−09 |
| S2 | 9.1945E−05 | −1.2074E−05 | 1.1475E−06 | −7.9437E−08 |
| S3 | −2.7071E−04 | 6.1682E−05 | −9.4026E−06 | 9.9579E−07 |
| S4 | −3.9659E−03 | 8.0719E−04 | −1.0063E−04 | 6.0212E−06 |
| S5 | −4.3092E−03 | 9.0861E−04 | −1.2188E−04 | 9.2023E−06 |
| S6 | 2.9372E−04 | −1.1472E−04 | 3.1545E−05 | −6.1517E−06 |
| S7 | 3.0699E−03 | −1.8032E−03 | 7.3208E−04 | −2.0881E−04 |
| S8 | −7.0940E−02 | 6.2453E−02 | −3.8569E−02 | 1.6839E−02 |
| S9 | 6.8994E−02 | −5.6236E−02 | 3.2831E−02 | −1.3791E−02 |
| S10 | −1.1773E−02 | 6.9848E−03 | −2.9141E−03 | 8.6482E−04 |
| S11 | 1.0913E−02 | −7.6640E−03 | 3.6240E−03 | −1.1778E−03 |
| S12 | 3.0104E−02 | −1.2833E−02 | 4.0061E−03 | −9.1181E−04 | imaging lens assembly has an imaging surface S15. Light from an object sequentially penetrates through each of the surfaces S1 to S14 and is finally imaged on the imaging surface S15.

In embodiment 2, a value of a total effective focal length f of the optical imaging lens assembly is 8.95 mm, TTL is an on-axis distance from the object-side surface S1 of the first lens E1 to the imaging surface S15, a value of TTL is 10.72 mm, and a value of ImgH (ImgH is a half of a diagonal length of an effective pixel region on the imaging surface S15) is 2.67 mm.

Table 3 shows a basic parameter table of the optical imaging lens assembly of embodiment 2, and units of the curvature radius, the thickness/distance and the focal length are all millimeter (mm). Table 4 shows high-order coefficients that can be used for each of aspheric mirror surfaces in embodiment 2. A surface type of each aspheric surface may be defined by the formula (1) given in embodiment 1.

TABLE 3

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −1.9981 | | | | |
| S1 | Aspheric | 4.6684 | 2.1004 | 1.54 | 56.1 | 12.15 | 0.0000 |
| S2 | Aspheric | 13.2739 | 0.2380 | | | | 0.0000 |
| S3 | Aspheric | 5.5497 | 0.5324 | 1.68 | 19.2 | −16.46 | 0.0000 |
| S4 | Aspheric | 3.5623 | 0.0469 | | | | 0.0000 |
| S5 | Aspheric | 3.3717 | 1.7483 | 1.54 | 56.1 | 7.33 | 0.0000 |
| S6 | Aspheric | 17.6022 | 0.6252 | | | | 0.0000 |
| S7 | Aspheric | 3.8598 | 0.5148 | 1.67 | 20.4 | −8.30 | 0.0000 |
| S8 | Aspheric | 2.1534 | 1.3878 | | | | 0.0000 |
| S9 | Aspheric | −99.7700 | 1.2000 | 1.68 | 19.2 | 7.30 | 0.0000 |
| S10 | Aspheric | −4.7350 | 0.3993 | | | | 0.0000 |
| S11 | Aspheric | −38.1962 | 1.0444 | 1.68 | 19.2 | −6.73 | 0.0000 |
| S12 | Aspheric | 5.2379 | 0.3793 | | | | 0.0000 |
| S13 | Spherical | Infinite | 0.2100 | 1.52 | 64.2 | | |
| S14 | Spherical | Infinite | 0.2933 | | | | |
| S15 | Spherical | Infinite | | | | | |

TABLE 4

| Surface number | A4 | A6 | A8 | A10 | A12 |
|---|---|---|---|---|---|
| S1 | −4.4135E−04 | −5.1540E−05 | 3.6249E−05 | −2.4144E−05 | 9.0485E−06 |
| S2 | 7.8485E−03 | −3.2634E−03 | 3.9837E−04 | 6.0189E−05 | −3.2874E−05 |
| S3 | 1.5281E−02 | −6.0806E−03 | 2.0340E−03 | −1.0100E−03 | 4.4669E−04 |
| S4 | 1.9880E−02 | −1.5784E−02 | 1.6100E−02 | −1.2524E−02 | 6.0310E−03 |
| S5 | 1.1837E−02 | −1.5366E−02 | 1.8844E−02 | −1.5129E−02 | 7.5108E−03 |
| S6 | −3.4153E−04 | 1.4908E−03 | −8.8837E−04 | 3.7573E−04 | −1.8326E−04 |
| S7 | −2.3012E−02 | 2.9213E−03 | 2.8706E−03 | −6.0383E−03 | 6.0773E−03 |
| S8 | −3.3357E−02 | 4.5446E−03 | −2.5368E−03 | 4.6079E−03 | −9.4761E−03 |
| S9 | −1.2840E−02 | −4.8365E−03 | 7.8193E−03 | −1.0734E−02 | 6.3159E−03 |
| S10 | −2.3161E−02 | 2.3396E−03 | 2.1284E−02 | −4.8771E−02 | 6.4858E−02 |
| S11 | −4.7357E−02 | 1.4472E−02 | 1.5569E−02 | −3.5335E−02 | 4.0331E−02 |
| S12 | −4.7827E−02 | 2.0708E−02 | −1.3901E−02 | 1.0153E−02 | −5.6546E−03 |

| Surface number | A14 | A16 | A18 | A20 |
|---|---|---|---|---|
| S1 | −2.2421E−06 | 3.8603E−07 | −4.7255E−08 | 4.1356E−09 |
| S2 | 6.3842E−06 | −7.3891E−07 | 5.5173E−08 | −2.5963E−09 |
| S3 | −1.3455E−04 | 2.7435E−05 | −3.8885E−06 | 3.8904E−07 |
| S4 | −1.8248E−03 | 3.4834E−04 | −3.9010E−05 | 1.5747E−06 |
| S5 | −2.4157E−03 | 5.1889E−04 | −7.4786E−05 | 7.0196E−06 |
| S6 | 8.2734E−05 | −2.7781E−05 | 6.5988E−06 | −1.1032E−06 |
| S7 | −4.0244E−03 | 1.8840E−03 | −6.3827E−04 | 1.5700E−04 |
| S8 | 1.1918E−02 | −9.6703E−03 | 5.3250E−03 | −2.0387E−03 |
| S9 | 1.7742E−03 | −6.2618E−03 | 5.3764E−03 | −2.6373E−03 |
| S10 | −5.8859E−02 | 3.7900E−02 | −1.7568E−02 | 5.8734E−03 |
| S11 | −3.0937E−02 | 1.6769E−02 | −6.5308E−03 | 1.8330E−03 |
| S12 | 1.9446E−03 | −2.5219E−04 | −9.9760E−05 | 6.2491E−05 |

Figure 4A:
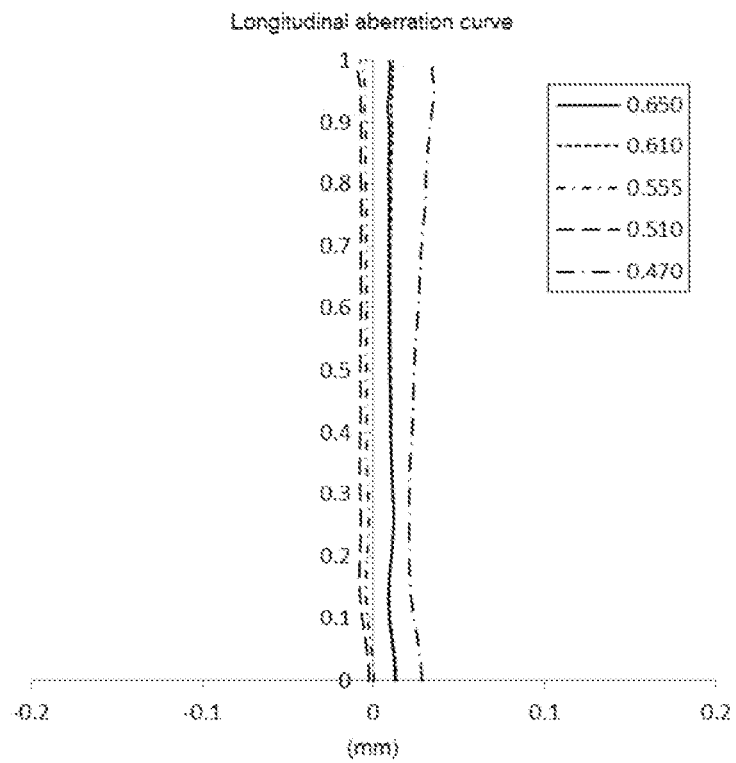
FIG. 4A to FIG. 4D show a longitudinal aberration curve, an astigmatism curve, a distortion curve and a lateral color curve of an optical imaging lens assembly according to embodiment 2 respectively.
Figure 4B:
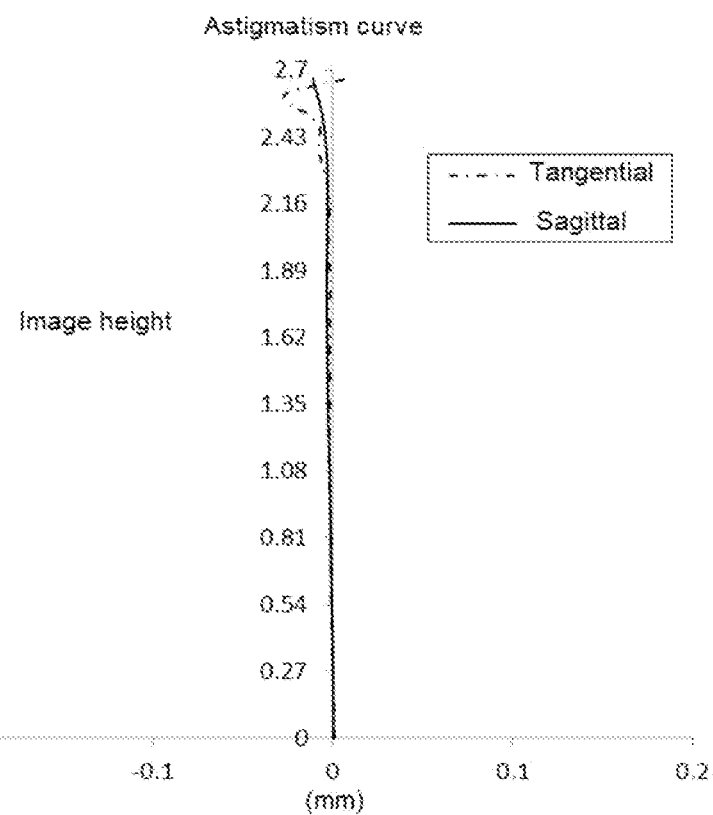
Figure 4C:
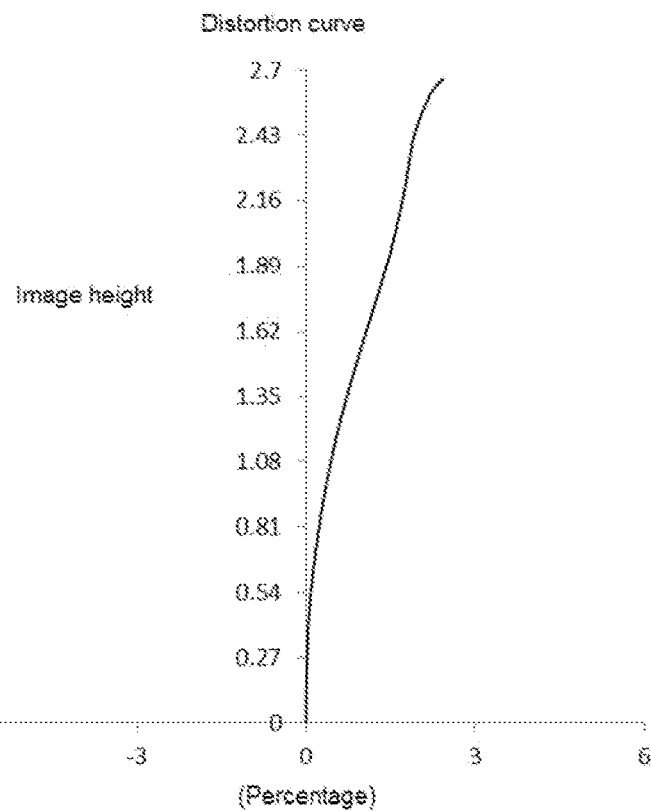
Figure 4D:
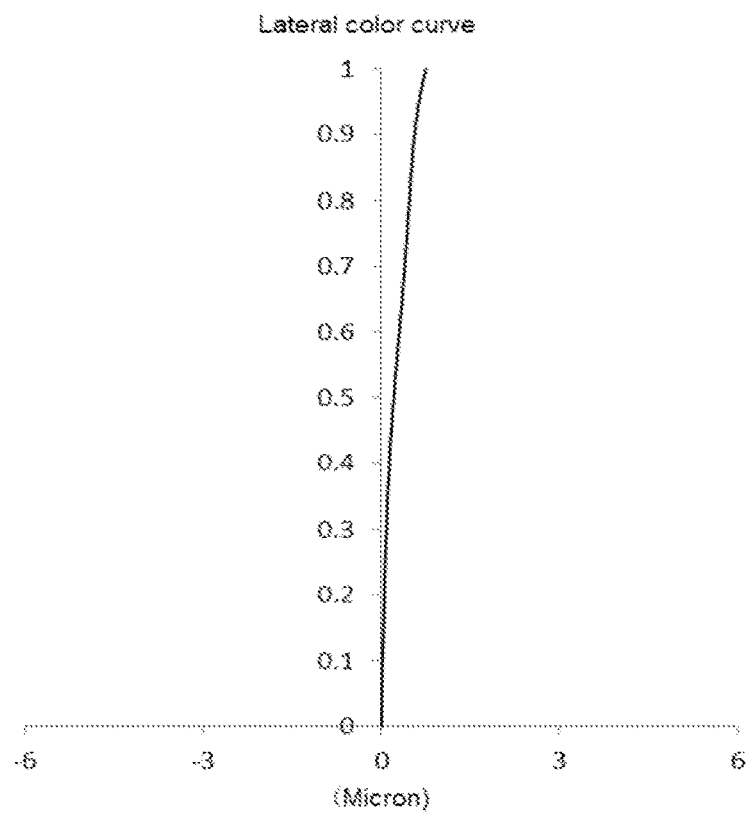

FIG. 4A shows a longitudinal aberration curve of the optical imaging lens assembly according to embodiment 2 to represent deviation of a convergence focal point after light with different wavelengths passes through the lens. FIG. 4B shows an astigmatism curve of the optical imaging lens assembly according to embodiment 2 to represent a tangential image surface curvature and a sagittal image surface curvature. FIG. 4C shows a distortion curve of the optical imaging lens assembly according to embodiment 2 to represent distortion values corresponding to different image heights. FIG. 4D shows a lateral color curve of the optical imaging lens assembly according to embodiment 2 to represent deviation of different image heights on the imaging surface after the light passes through the lens. According to FIG. 4A to FIG. 4D, it can be seen that the optical imaging lens assembly provided in embodiment 2 may achieve high imaging quality.

Embodiment 3

Figure 5:
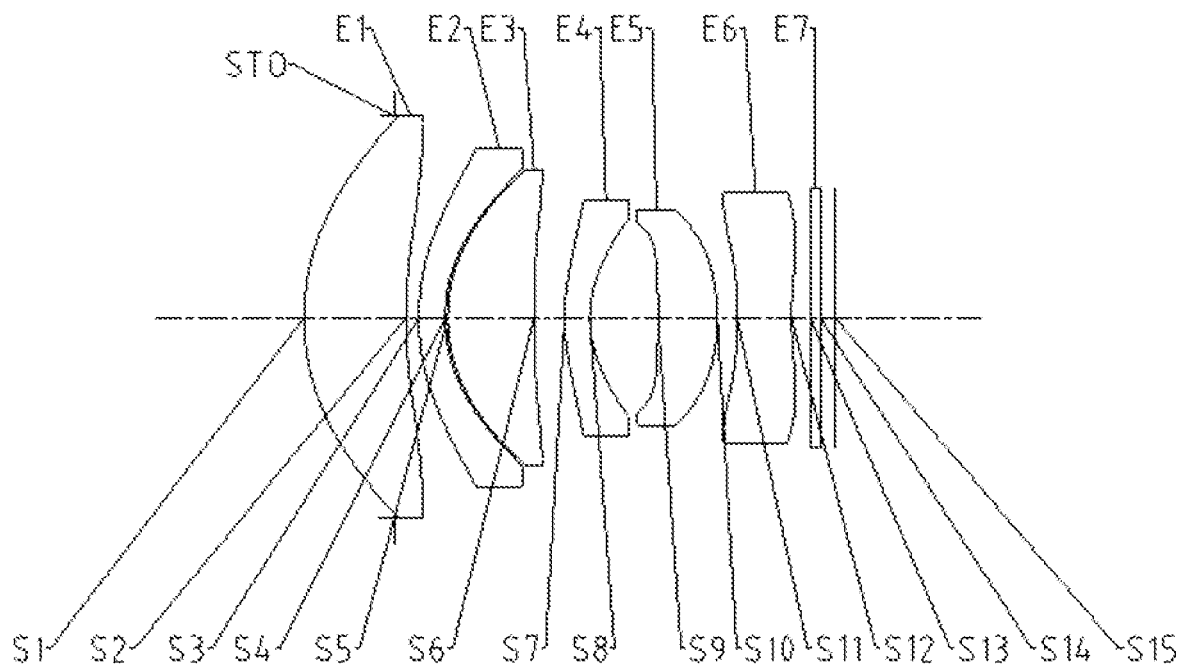
FIG. 5 shows a structure diagram of an optical imaging lens assembly according to embodiment 3 of the disclosure.

An optical imaging lens assembly according to embodiment 3 of the disclosure is described below with reference to FIG. 5 to FIG. 6D. FIG. 5 is a structure diagram of an optical imaging lens assembly according to embodiment 3 of the disclosure.

As shown in FIG. 5, the optical imaging lens assembly sequentially includes, from an object side to an image side along an optical axis, a diaphragm STO, a first lens E1, a second lens E2, a third lens E3, a fourth lens E4, a fifth lens E5, a sixth lens E6 and an optical filter E7.

The first lens E1 has a positive refractive power, an object-side surface S1 thereof is a convex surface, while an image-side surface S2 is a concave surface. The second lens E2 has a negative refractive power, an object-side surface S3 thereof is a convex surface, while an image-side surface S4 is a concave surface. The third lens E3 has a positive refractive power, an object-side surface S5 thereof is a convex surface, while an image-side surface S6 is a concave surface. The fourth lens E4 has a negative refractive power, an object-side surface S7 thereof is a convex surface, while an image-side surface S8 is a concave surface. The fifth lens E5 has a positive refractive power, an object-side surface S9 thereof is a concave surface, while an image-side surface S10 is a convex surface. The sixth lens E6 has a negative refractive power, an object-side surface S11 thereof is a concave surface, while an image-side surface S12 is a concave surface. The optical filter E7 has an object-side surface S13 and an image-side surface S14. The optical imaging lens assembly has an imaging surface S15. Light from an object sequentially penetrates through each of the surfaces S1 to S14 and is finally imaged on the imaging surface S15.

In embodiment 3, a value of a total effective focal length f of the optical imaging lens assembly is 8.95 mm, TTL is an on-axis distance from the object-side surface S1 of the first lens E1 to the imaging surface S15, a value of TTL is 10.72 mm, and a value of ImgH (ImgH is a half of a diagonal length of an effective pixel region on the imaging surface S15) is 2.67 mm.

Table 5 shows a basic parameter table of the optical imaging lens assembly of embodiment 3, and units of the curvature radius, the thickness/distance and the focal length are all millimeter (mm). Table 6 shows high-order coefficients that can be used for each of aspheric mirror surfaces in embodiment 3. A surface type of each aspheric surface may be defined by the formula (1) given in embodiment 1.

TABLE 5

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −1.8128 | | | | |
| S1 | Aspheric | 4.6671 | 2.0643 | 1.54 | 56.1 | 12.34 | 0.0000 |
| S2 | Aspheric | 12.8426 | 0.2575 | | | | 0.0000 |
| S3 | Aspheric | 5.4723 | 0.5318 | 1.68 | 19.2 | −16.78 | 0.0000 |
| S4 | Aspheric | 3.5495 | 0.0463 | | | | 0.0000 |
| S5 | Aspheric | 3.3614 | 1.7393 | 1.54 | 56.1 | 7.15 | 0.0000 |
| S6 | Aspheric | 19.8776 | 0.6210 | | | | 0.0000 |
| S7 | Aspheric | 3.9487 | 0.5073 | 1.67 | 20.4 | −8.01 | 0.0000 |
| S8 | Aspheric | 2.1540 | 1.3790 | | | | 0.0000 |
| S9 | Aspheric | −99.6600 | 1.2000 | 1.68 | 19.2 | 6.97 | 0.0000 |
| S10 | Aspheric | −4.5334 | 0.3962 | | | | 0.0000 |
| S11 | Aspheric | −22.4156 | 1.0987 | 1.68 | 19.2 | −6.35 | 0.0000 |
| S12 | Aspheric | 5.4287 | 0.3774 | | | | 0.0000 |
| S13 | Spherical | Infinite | 0.2100 | 1.52 | 64.2 | | |
| S14 | Spherical | Infinite | 0.2914 | | | | |
| S15 | Spherical | Infinite | | | | | |

TABLE 6

| Surface number | A4 | A6 | A8 | A10 | A12 |
|---|---|---|---|---|---|
| S1 | −3.7275E−04 | −8.8592E−05 | 5.3349E−05 | −3.1861E−05 | 1.1681E−05 |
| S2 | 8.3568E−03 | −3.6953E−03 | 4.5752E−04 | 1.3334E−04 | −7.7217E−05 |
| S3 | 1.5438E−02 | −5.2549E−03 | 3.4712E−04 | 2.5778E−04 | −7.9481E−05 |
| S4 | 1.5810E−02 | 1.6007E−04 | −7.0004E−03 | 5.3851E−03 | −2.6763E−03 |
| S5 | 7.1371E−03 | 2.4185E−03 | −6.3118E−03 | 4.2505E−03 | −1.9308E−03 |
| S6 | −1.6666E−04 | 1.8175E−03 | −1.7156E−03 | 1.2123E−03 | −7.5395E−04 |
| S7 | −2.4178E−02 | 3.3128E−03 | 3.0923E−03 | −7.6128E−03 | 8.7978E−03 |

TABLE 6-continued

| S8 | −3.4830E−02 | 4.5894E−03 | −3.1502E−04 | −1.5455E−03 | 1.3531E−04 |
| S9 | −1.3507E−02 | −2.8835E−03 | 7.4677E−04 | 5.3933E−03 | −1.9763E−02 |
| S10 | −2.3748E−02 | 5.6138E−03 | 1.1038E−02 | −2.9839E−02 | 4.1471E−02 |
| S11 | −4.6194E−02 | 1.5886E−02 | 1.1845E−02 | −3.1540E−02 | 3.8856E−02 |
| S12 | −4.6109E−02 | 2.0296E−02 | −1.4482E−02 | 1.1222E−02 | −6.6542E−03 |

| Surface number | A14 | A16 | A18 | A20 |
|---|---|---|---|---|
| S1 | −2.8938E−06 | 5.0481E−07 | −6.3387E−08 | 5.7587E−09 |
| S2 | 1.8835E−05 | −2.8984E−06 | 3.0743E−07 | −2.3096E−08 |
| S3 | 4.7735E−06 | 2.0318E−06 | −5.4111E−07 | 5.9798E−08 |
| S4 | 1.0987E−03 | −3.7832E−04 | 1.0106E−04 | −1.9664E−05 |
| S5 | 7.6332E−04 | −2.6944E−04 | 7.5537E−05 | −1.5368E−05 |
| S6 | 3.6668E−04 | −1.3091E−04 | 3.3762E−05 | −6.2543E−06 |
| S7 | −6.6072E−03 | 3.4754E−03 | −1.3152E−03 | 3.6020E−04 |
| S8 | 2.3310E−03 | −3.1207E−03 | 2.1499E−03 | −9.3331E−04 |
| S9 | 3.2210E−02 | −3.2104E−02 | 2.1363E−02 | −9.8080E−03 |
| S10 | −3.8752E−02 | 2.5597E−02 | −1.2151E−02 | 4.1551E−03 |
| S11 | −3.1794E−02 | 1.8277E−02 | −7.5193E−03 | 2.2231E−03 |
| S12 | 2.5659E−03 | −5.2134E−04 | −1.7529E−05 | 4.4847E−05 |

Figure 6A:
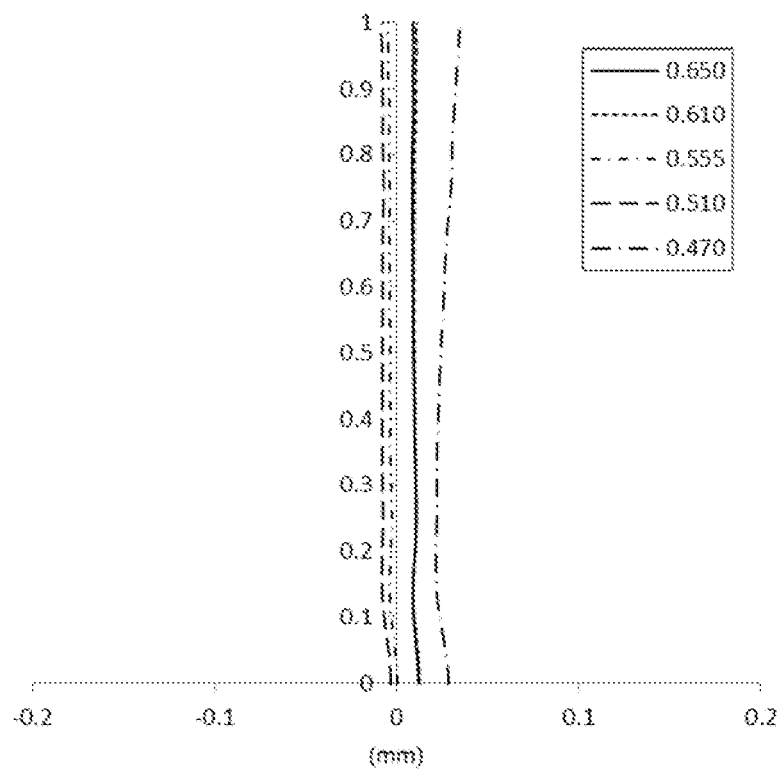
FIG. 6A to FIG. 6D show a longitudinal aberration curve, an astigmatism curve, a distortion curve and a lateral color curve of an optical imaging lens assembly according to embodiment 3 respectively.
Figure 6B:
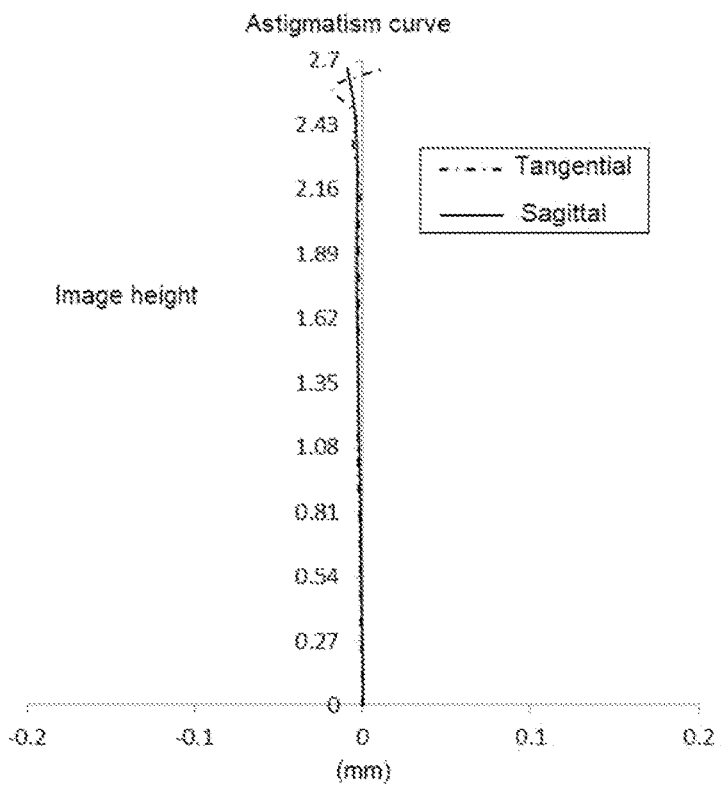
Figure 6C:
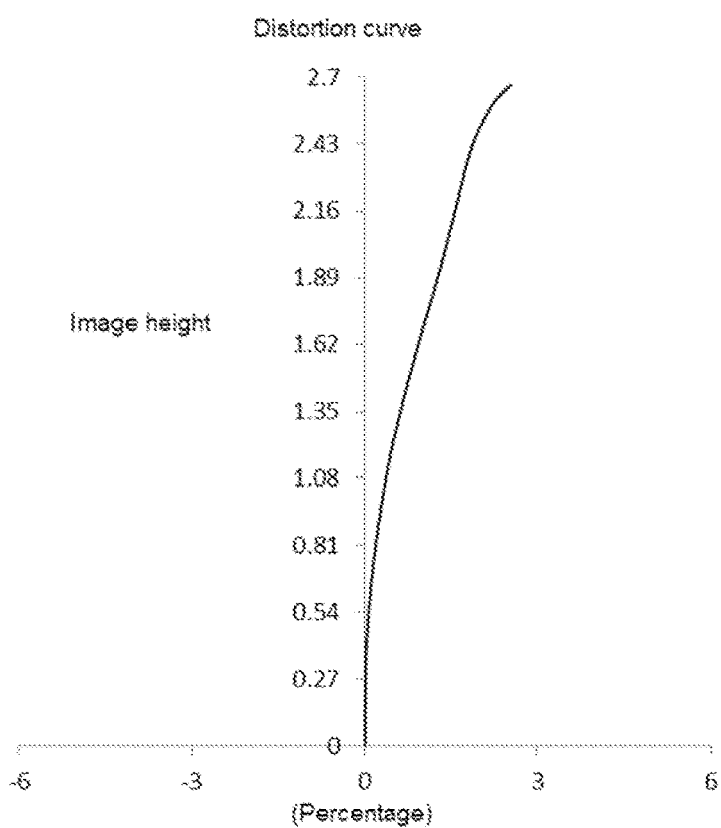
Figure 6D:
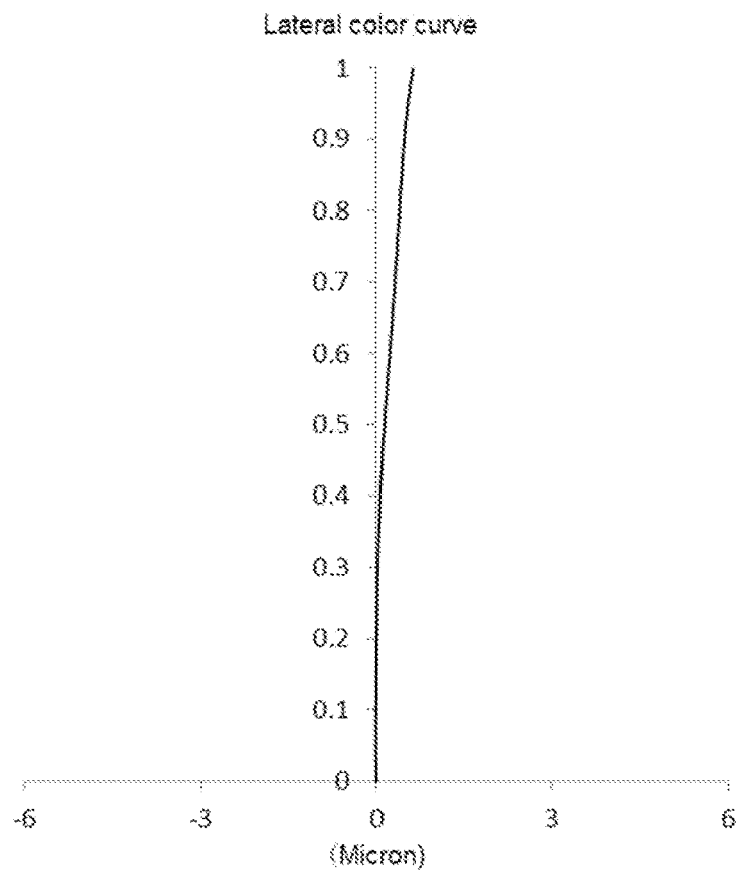

FIG. 6A shows a longitudinal aberration curve of the optical imaging lens assembly according to embodiment 3 to represent deviation of a convergence focal point after light with different wavelengths passes through the lens. FIG. 6B shows an astigmatism curve of the optical imaging lens assembly according to embodiment 3 to represent a tangential image surface curvature and a sagittal image surface curvature. FIG. 6C shows a distortion curve of the optical imaging lens assembly according to embodiment 3 to represent distortion values corresponding to different image heights. FIG. 6D shows a lateral color curve of the optical imaging lens assembly according to embodiment 3 to represent deviation of different image heights on the imaging surface after the light passes through the lens. According to FIG. 6A to FIG. 6D, it can be seen that the optical imaging lens assembly provided in embodiment 3 may achieve high imaging quality.

Embodiment 4

Figure 7:
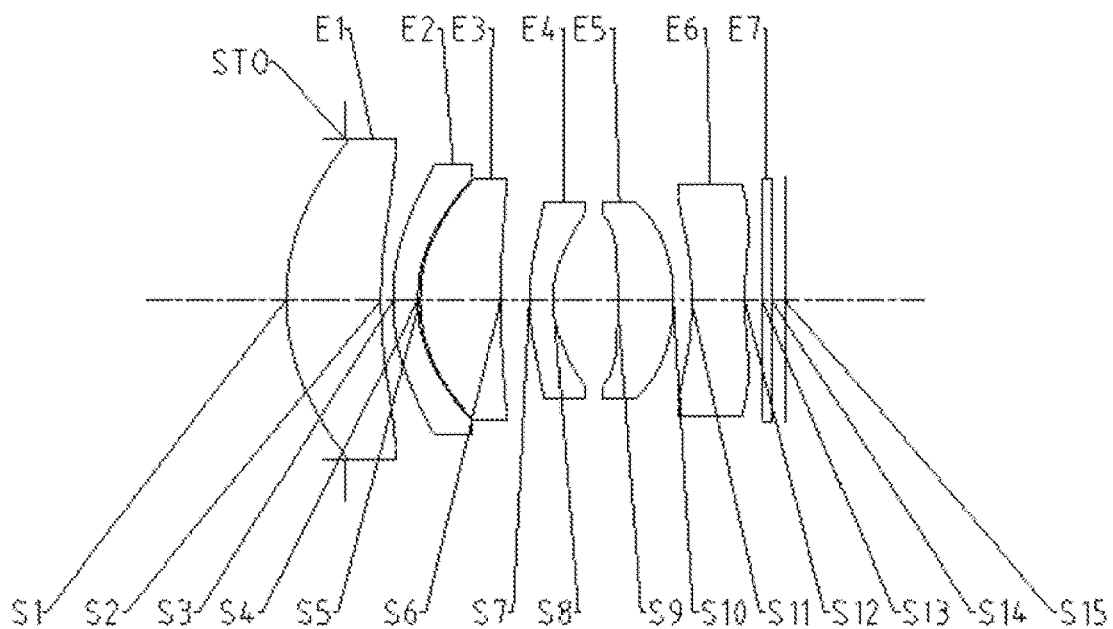
FIG. 7 shows a structure diagram of an optical imaging lens assembly according to embodiment 4 of the disclosure.

An optical imaging lens assembly according to embodiment 4 of the disclosure is described below with reference to FIG. 7 to FIG. 8D. FIG. 7 is a structure diagram of an optical imaging lens assembly according to embodiment 4 of the disclosure.

As shown in FIG. 7, the optical imaging lens assembly sequentially includes, from an object side to an image side along an optical axis, a diaphragm STO, a first lens E1, a second lens E2, a third lens E3, a fourth lens E4, a fifth lens E5, a sixth lens E6 and an optical filter E7.

The first lens E1 has a positive refractive power, an object-side surface S1 thereof is a convex surface, while an image-side surface S2 is a concave surface. The second lens E2 has a negative refractive power, an object-side surface S3 thereof is a convex surface, while an image-side surface S4 is a concave surface. The third lens E3 has a positive refractive power, an object-side surface S5 thereof is a convex surface, while an image-side surface S6 is a concave surface. The fourth lens E4 has a negative refractive power, an object-side surface S7 thereof is a convex surface, while an image-side surface S8 is a concave surface. The fifth lens E5 has a positive refractive power, an object-side surface S9 thereof is a concave surface, while an image-side surface S10 is a convex surface. The sixth lens E6 has a negative refractive power, an object-side surface S11 thereof is a concave surface, while an image-side surface S12 is a concave surface. The optical filter E7 has an object-side surface S13 and an image-side surface S14. The optical imaging lens assembly has an imaging surface S15. Light from an object sequentially penetrates through each of the surfaces S1 to S14 and is finally imaged on the imaging surface S15.

In embodiment 4, a value of a total effective focal length f of the optical imaging lens assembly is 8.95 mm, TTL is an on-axis distance from the object-side surface S1 of the first lens E1 to the imaging surface S15, a value of TTL is 10.72 mm, and a value of ImgH (ImgH is a half of a diagonal length of an effective pixel region on the imaging surface) S15 is 2.67 mm.

Table 7 shows a basic parameter table of the optical imaging lens assembly of embodiment 4, and units of the curvature radius, the thickness/distance and the focal length are all millimeter (mm). Table 8 shows high-order coefficients that can be used for each of aspheric mirror surfaces in embodiment 4. A surface type of each aspheric surface may be defined by the formula (1) given in embodiment 1.

TABLE 7

| Surface number | Surface type | Curvature radius | Thickness/ distance | Material Refractive index | Material Abbe number | Focal length | Conic coefficient |
|---|---|---|---|---|---|---|---|
| OBJ | Spherical | Infinite | Infinite | | | | |
| STO | Spherical | Infinite | −1.2603 | | | | |
| S1 | Aspheric | 4.6672 | 2.0406 | 1.54 | 56.1 | 12.50 | 0.0000 |
| S2 | Aspheric | 12.5185 | 0.2593 | | | | 0.0000 |
| S3 | Aspheric | 5.4171 | 0.5317 | 1.68 | 19.2 | −17.19 | 0.0000 |
| S4 | Aspheric | 3.5511 | 0.0462 | | | | 0.0000 |
| S5 | Aspheric | 3.3657 | 1.7339 | 1.54 | 56.1 | 7.03 | 0.0000 |
| S6 | Aspheric | 22.4772 | 0.6187 | | | | 0.0000 |

TABLE 7-continued

| Surface number | Surface type | Curvature radius | Thickness/ distance | Material Refractive index | Abbe number | Focal length | Conic coefficient |
|---|---|---|---|---|---|---|---|
| S7 | Aspheric | 4.0560 | 0.5031 | 1.67 | 20.4 | −111 | 0.0000 |
| S8 | Aspheric | 2.1625 | 1.3746 | | | | 0.0000 |
| S9 | Aspheric | −99.2200 | 1.2000 | 1.68 | 19.2 | 6.81 | 0.0000 |
| S10 | Aspheric | −4.4290 | 0.3919 | | | | 0.0000 |
| S11 | Aspheric | −18.9102 | 1.1417 | 1.68 | 19.2 | −6.12 | 0.0000 |
| S12 | Aspheric | 5.4364 | 0.3771 | | | | 0.0000 |
| S13 | Spherical | Infinite | 0.2100 | 1.52 | 64.2 | | |
| S14 | Spherical | Infinite | 0.2911 | | | | |
| S15 | Spherical | Infinite | | | | | |

TABLE 8

| Surface number | A4 | A6 | A8 | A10 | A12 |
|---|---|---|---|---|---|
| S1 | −3.5315E−04 | −1.7103E−04 | 1.9367E−04 | −1.5995E−04 | 8.1125E−05 |
| S2 | 7.9614E−03 | −1.5846E−03 | −2.7058E−03 | 2.5590E−03 | −1.2255E−03 |
| S3 | 1.4359E−02 | −5.6948E−04 | −6.4978E−03 | 5.4779E−03 | −2.4973E−03 |
| S4 | 1.0994E−02 | 1.6489E−02 | −2.7598E−02 | 1.5977E−02 | −1.9107E−03 |
| S5 | 2.1658E−03 | 1.8187E−02 | −2.4803E−02 | 1.1776E−02 | 1.5705E−03 |
| S6 | −2.2589E−04 | 2.5097E−03 | −3.5959E−03 | 4.1689E−03 | −3.8375E−03 |
| S7 | −2.5459E−02 | 5.8131E−03 | −3.1613E−03 | 3.3959E−03 | −4.4471E−03 |
| S8 | −3.6364E−02 | 7.3405E−03 | −7.6255E−03 | 1.3076E−02 | −1.9975E−02 |
| S9 | −1.4541E−02 | 1.3653E−03 | −1.8313E−02 | 6.1125E−02 | −1.3081E−01 |
| S10 | −2.5699E−02 | 1.1101E−02 | −3.7115E−03 | −1.3364E−03 | 3.9193E−03 |
| S11 | −4.7707E−02 | 1.9837E−02 | 5.2231E−03 | −2.2490E−02 | 3.0313E−02 |
| S12 | −4.6566E−02 | 1.8514E−02 | −7.5236E−03 | −3.5913E−04 | 5.2407E−03 |

| Surface number | A14 | A16 | A18 | A20 |
|---|---|---|---|---|
| S1 | −2.7411E−05 | 6.4557E−06 | −1.0856E−06 | 1.3136E−07 |
| S2 | 3.8475E−04 | −8.5077E−05 | 1.3623E−05 | −1.5913E−06 |
| S3 | 7.3450E−04 | −1.4615E−04 | 1.9791E−05 | −1.7761E−06 |
| S4 | −2.9750E−03 | 2.1469E−03 | −7.6052E−04 | 1.6885E−04 |
| S5 | −4.9838E−03 | 2.9827E−03 | −1.0127E−03 | 2.2386E−04 |
| S6 | 2.5985E−03 | −1.2769E−03 | 4.5625E−04 | −1.1839E−04 |
| S7 | 4.7211E−03 | −3.5497E−03 | 1.8630E−03 | −6.8526E−04 |
| S8 | 2.1709E−02 | −1.6104E−02 | 7.9694E−03 | −2.5014E−03 |
| S9 | 1.8696E−01 | −1.8573E−01 | 1.3102E−01 | −6.6098E−02 |
| S10 | −4.4506E−03 | 3.3975E−03 | −1.8368E−03 | 7.0534E−04 |
| S11 | −2.6535E−02 | 1.6284E−02 | −7.1552E−03 | 2.2605E−03 |
| S12 | −5.6939E−03 | 3.5108E−03 | −1.4265E−03 | 3.9880E−04 |

Figure 8A:
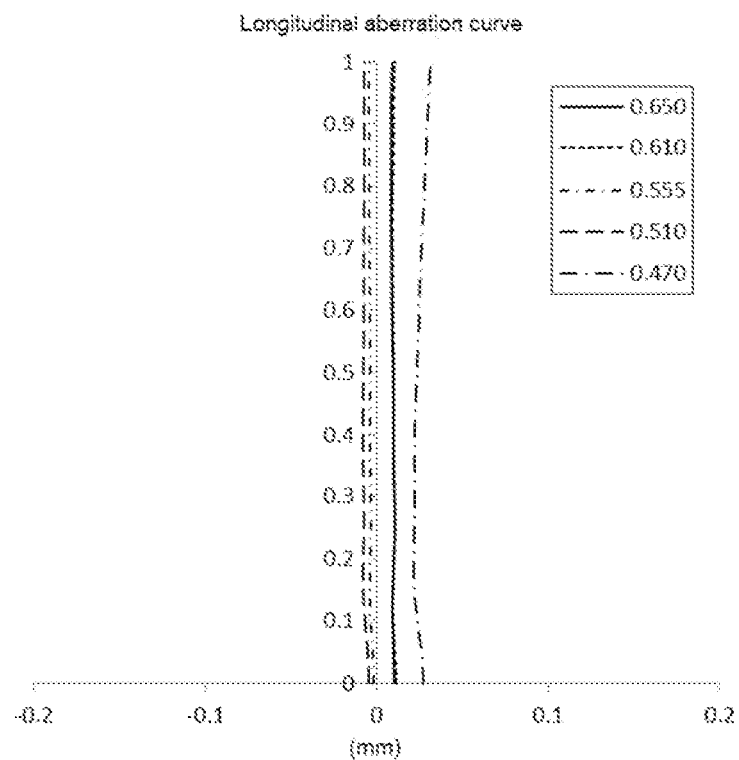
FIG. 8A to FIG. 8D show a longitudinal aberration curve, an astigmatism curve, a distortion curve and a lateral color curve of an optical imaging lens assembly according to embodiment 4 respectively.
Figure 8B:
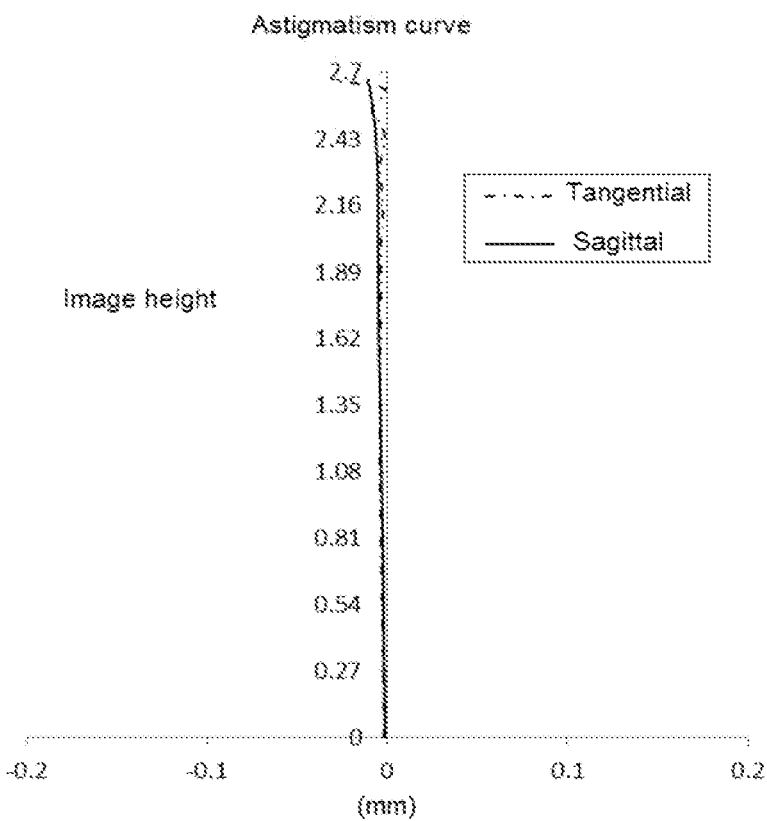
Figure 8C:
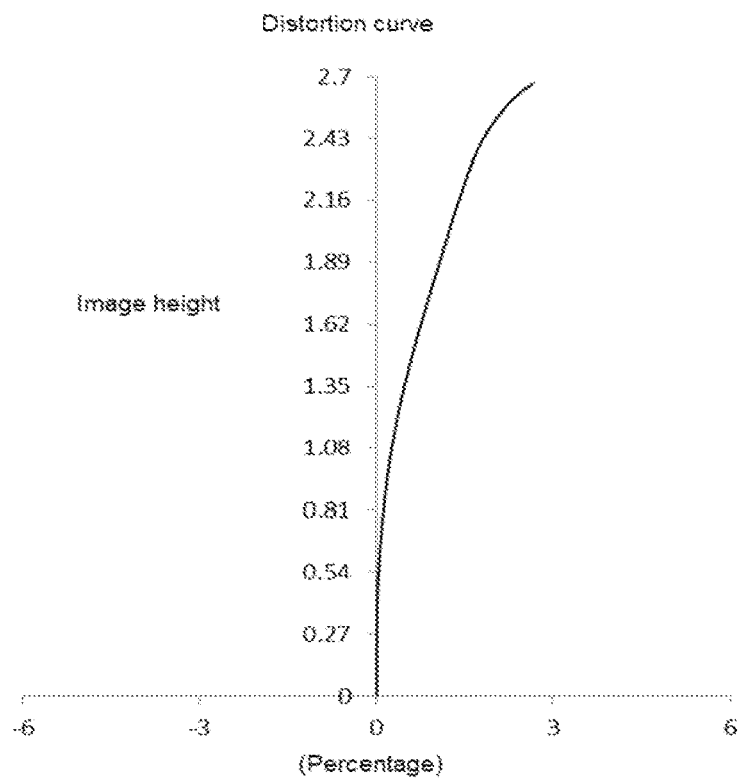
Figure 8D:
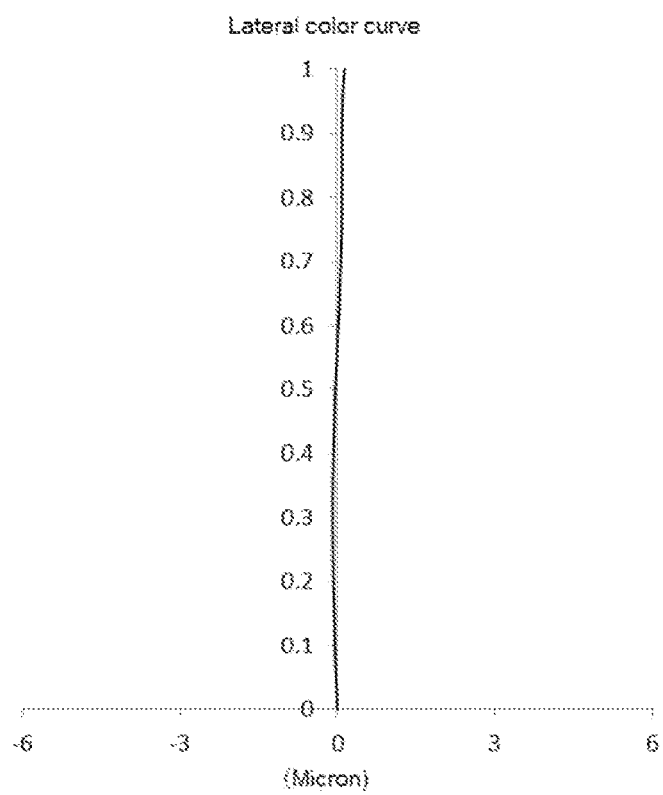

FIG. 8A shows a longitudinal aberration curve of the optical imaging lens assembly according to embodiment 4 to represent deviation of a convergence focal point after light with different wavelengths passes through the lens. FIG. 8B shows an astigmatism curve of the optical imaging lens assembly according to embodiment 4 to represent a tangential image surface curvature and a sagittal image surface curvature. FIG. 8C shows a distortion curve of the optical imaging lens assembly according to embodiment 4 to represent distortion values corresponding to different image heights. FIG. 8D shows a lateral color curve of the optical imaging lens assembly according to embodiment 4 to represent deviation of different image heights on the imaging surface after the light passes through the lens. According to FIG. 8A to FIG. 8D, it can be seen that the optical imaging lens assembly provided in embodiment 4 may achieve high imaging quality.

Embodiment 5

Figure 9:
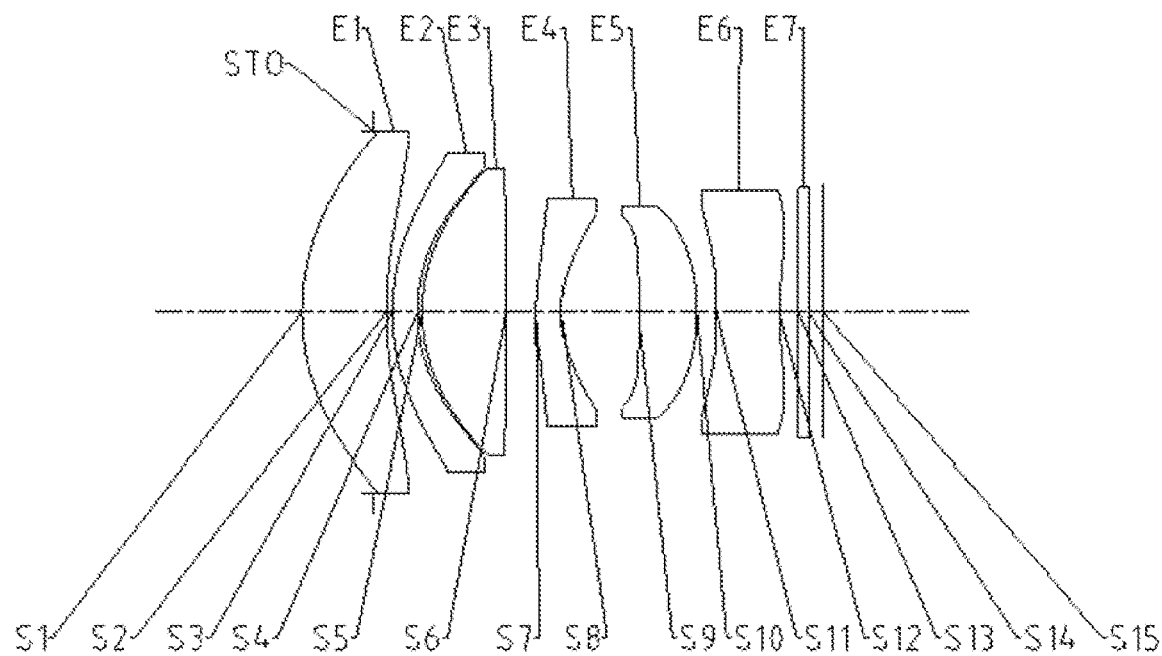
FIG. 9 shows a structure diagram of an optical imaging lens assembly according to embodiment 5 of the disclosure.

An optical imaging lens assembly according to embodiment 5 of the disclosure is described below with reference to FIG. 9 to FIG. 10D. FIG. 9 shows a structure diagram of an optical imaging lens assembly according to embodiment 5 of the disclosure.

As shown in FIG. 9, the optical imaging lens assembly sequentially includes, from an object side to an image side along an optical axis, a diaphragm STO, a first lens E1, a second lens E2, a third lens E3, a fourth lens E4, a fifth lens E5, a sixth lens E6 and an optical filter E7.

The first lens E1 has a positive refractive power, an object-side surface S1 thereof is a convex surface, while an image-side surface S2 is a concave surface. The second lens E2 has a negative refractive power, an object-side surface S3 thereof is a convex surface, while an image-side surface S4 is a concave surface. The third lens E3 has a positive refractive power, an object-side surface S5 thereof is a convex surface, while an image-side surface S6 is a convex surface. The fourth lens E4 has a negative refractive power, an object-side surface S7 thereof is a convex surface, while an image-side surface S8 is a concave surface. The fifth lens E5 has a positive refractive power, an object-side surface S9 thereof is a convex surface, while an image-side surface S10 is a convex surface. The sixth lens E6 has a negative refractive power, an object-side surface S11 thereof is a concave surface, while an image-side surface S12 is a concave surface. The optical filter E7 has an object-side surface S13 and an image-side surface S14. The optical imaging lens assembly has an imaging surface S15. Light from an object sequentially penetrates through each of the surfaces S1 to S14 and is finally imaged on the imaging surface S15.

In embodiment 5, a value of a total effective focal length f of the optical imaging lens assembly is 8.92 mm, TTL is an on-axis distance from the object-side surface S1 of the first lens E1 to the imaging surface S15, a value of TTL is 10.72 mm, and a value of ImgH (ImgH is a half of a diagonal length of an effective pixel region on the imaging surface S15) is 2.65 mm.

Table 9 shows a basic parameter table of the optical imaging lens assembly of embodiment 5, and units of the curvature radius, the thickness/distance and the focal length are all millimeter (mm). Table 10 shows high-order coefficients that can be used for each of aspheric mirror surfaces in embodiment 5. A surface type of each aspheric surface may be defined by the formula (1) given in embodiment 1.

TABLE 9

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −1.4624 | | | | |
| S1 | Aspheric | 4.6920 | 1.7387 | 1.54 | 56.1 | 14.24 | 0.0000 |
| S2 | Aspheric | 10.3024 | 0.1231 | | | | 0.0000 |
| S3 | Aspheric | 5.2292 | 0.5165 | 1.68 | 19.2 | −23.35 | 0.0000 |
| S4 | Aspheric | 3.7735 | 0.0946 | | | | 0.0000 |
| S5 | Aspheric | 3.7009 | 1.7284 | 1.54 | 56.1 | 6.56 | 0.0000 |
| S6 | Aspheric | −91.2500 | 0.6192 | | | | 0.0000 |
| S7 | Aspheric | 4.8670 | 0.5038 | 1.67 | 20.4 | −6.63 | 0.0000 |
| S8 | Aspheric | 2.2213 | 1.5925 | | | | 0.0000 |
| S9 | Aspheric | 84.9324 | 1.2000 | 1.68 | 19.2 | 7.07 | 0.0000 |
| S10 | Aspheric | −5.0503 | 0.4020 | | | | 0.0000 |
| S11 | Aspheric | −29.3611 | 1.2988 | 1.68 | 19.2 | −6.41 | 0.0000 |
| S12 | Aspheric | 5.1927 | 0.3889 | | | | 0.0000 |
| S13 | Spherical | Infinite | 0.2100 | 1.52 | 64.2 | | |
| S14 | Spherical | Infinite | 0.3029 | | | | |
| S15 | Spherical | Infinite | | | | | |

TABLE 10

| Surface number | A4 | A6 | A8 | A10 | A12 |
|---|---|---|---|---|---|
| S1 | −5.7326E−04 | −1.3515E−04 | 1.4042E−04 | −9.4601E−05 | 3.9936E−05 |
| S2 | 8.6025E−03 | −3.0255E−03 | −1.0431E−03 | 1.2777E−03 | −5.7006E−04 |
| S3 | 1.3916E−02 | −2.2001E−03 | −2.8549E−03 | 2.1634E−03 | −7.5007E−04 |
| S4 | 1.3839E−02 | 3.1972E−03 | −8.1120E−03 | 2.7270E−03 | 1.5106E−03 |
| S5 | 7.3420E−03 | 3.2563E−03 | −6.2558E−03 | 1.2052E−03 | 2.3578E−03 |
| S6 | 1.0814E−02 | 9.5830E−04 | −1.5421E−03 | 1.2880E−03 | −7.6514E−04 |
| S7 | −2.6803E−02 | 6.0240E−03 | −1.3388E−03 | −1.0346E−03 | 2.5472E−03 |
| S8 | −3.9389E−02 | 6.5786E−03 | 2.5898E−03 | −1.6867E−02 | 3.4014E−02 |
| S9 | −1.1648E−02 | 2.1511E−03 | −1.5631E−02 | 4.1295E−02 | −7.2566E−02 |
| S10 | −2.3824E−02 | 9.6119E−03 | −5.9687E−03 | 5.6565E−03 | −5.9200E−03 |
| S11 | −4.2656E−02 | 1.5473E−02 | −2.2813E−03 | −1.8997E−03 | 3.1308E−03 |
| S12 | −3.6921E−02 | 8.6617E−03 | −1.0475E−03 | −9.0448E−04 | 9.4519E−04 |

| Surface number | A14 | A16 | A18 | A20 |
|---|---|---|---|---|
| S1 | −1.1465E−05 | 2.3200E−06 | −3.3725E−07 | 3.5403E−08 |
| S2 | 1.5677E−04 | −2.9589E−05 | 3.9870E−06 | −3.8843E−07 |
| S3 | 1.4214E−04 | −1.0637E−05 | −1.5992E−06 | 5.6780E−07 |
| S4 | −1.8695E−03 | 9.0712E−04 | −2.7036E−04 | 5.4398E−05 |
| S5 | −2.2712E−03 | 1.0655E−03 | −3.1787E−04 | 6.4679E−05 |
| S6 | 3.2789E−04 | −1.0121E−04 | 2.2416E−05 | −3.5177E−06 |
| S7 | −2.6141E−03 | 1.6883E−03 | −7.4539E−04 | 2.3095E−04 |
| S8 | −4.2607E−02 | 3.6216E−02 | −2.1604E−02 | 9.1461E−03 |
| S9 | 8.6752E−02 | −7.2639E−02 | 4.3279E−02 | −1.8429E−02 |
| S10 | 4.8045E−03 | −2.8314E−03 | 1.2077E−03 | −3.7274E−04 |
| S11 | −2.8457E−03 | 1.7753E−03 | −7.8306E−04 | 2.4669E−04 |
| S12 | −5.6821E−04 | 2.4976E−04 | −8.1903E−05 | 1.9690E−05 |

Figure 10A:
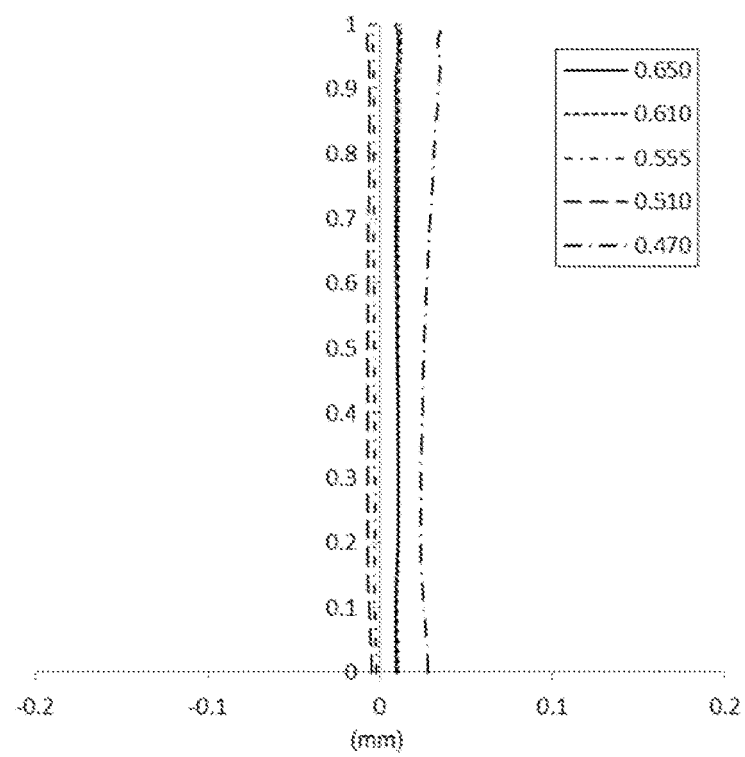
FIG. 10A to FIG. 10D show a longitudinal aberration curve, an astigmatism curve, a distortion curve and a lateral color curve of an optical imaging lens assembly according to embodiment 5 respectively.
Figure 10B:
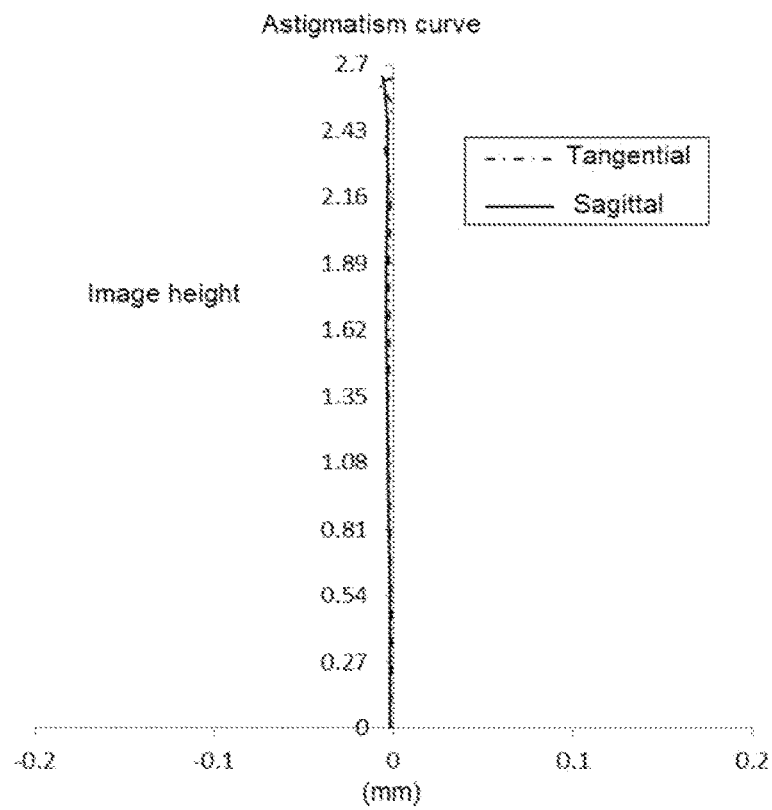
Figure 10C:
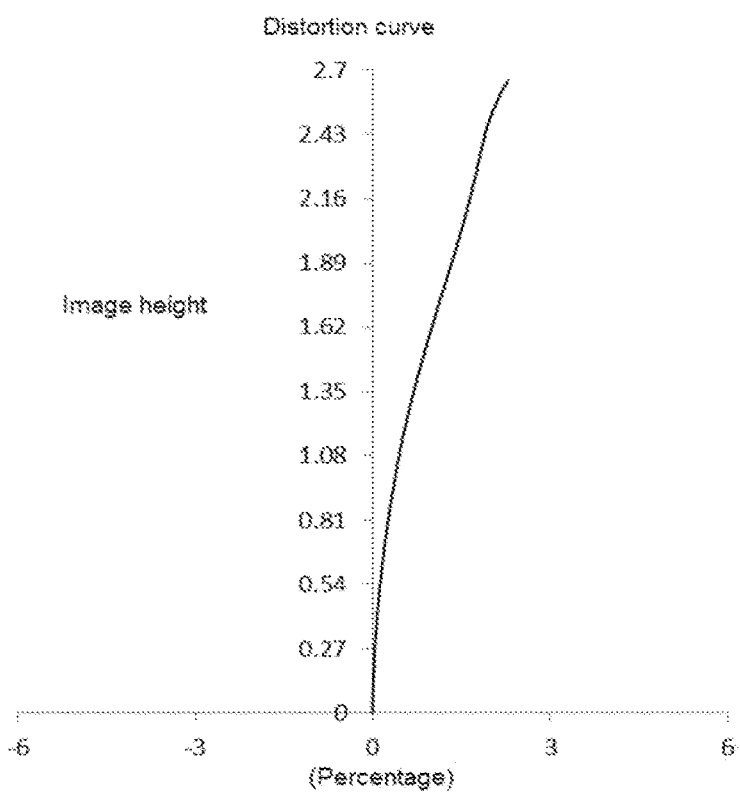
Figure 10D:
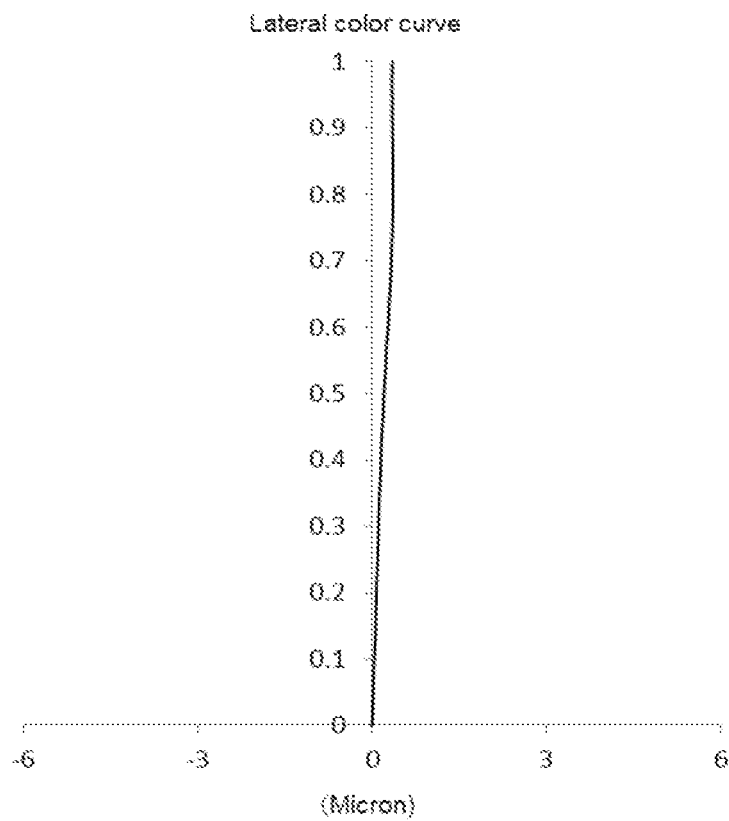

FIG. 10A shows a longitudinal aberration curve of the optical imaging lens assembly according to embodiment 5 to represent deviation of a convergence focal point after light with different wavelengths passes through the lens. FIG. 10B shows an astigmatism curve of the optical imaging lens assembly according to embodiment 5 to represent a tangential image surface curvature and a sagittal image surface curvature. FIG. 10C shows a distortion curve of the optical imaging lens assembly according to embodiment 5 to represent distortion values corresponding to different image heights. FIG. 10D shows a lateral color curve of the optical imaging lens assembly according to embodiment 5 to represent deviation of different image heights on the imaging surface after the light passes through the lens. According to FIG. 10A to FIG. 10D, it can be seen that the optical imaging lens assembly provided in embodiment 5 may achieve high imaging quality.

Embodiment 6

Figure 11:
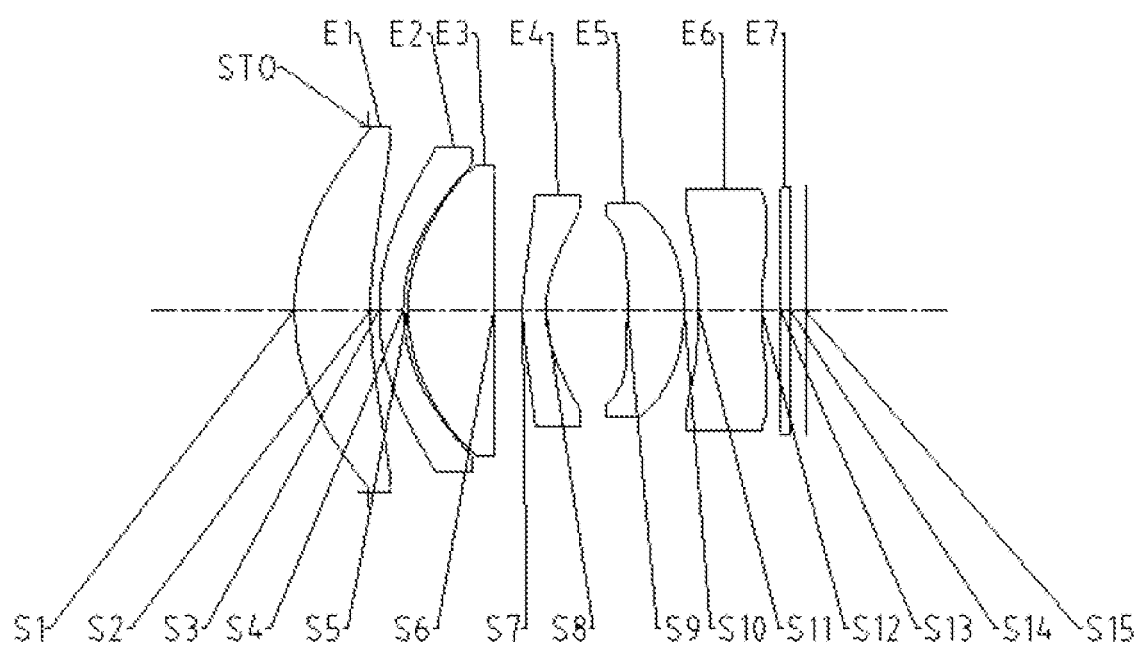
FIG. 11 shows a structure diagram of an optical imaging lens assembly according to embodiment 6 of the disclosure.

An optical imaging lens assembly according to embodiment 6 of the disclosure is described below with reference to FIG. 11 to FIG. 12D. FIG. 11 shows a structure diagram of an optical imaging lens assembly according to embodiment 6 of the disclosure.

As shown in FIG. 11, the optical imaging lens assembly sequentially includes, from an object side to an image side along an optical axis, a diaphragm STO, a first lens E1, a second lens E2, a third lens E3, a fourth lens E4, a fifth lens E5, a sixth lens E6 and an optical filter E7.

The first lens E1 has a positive refractive power, an object-side surface S1 thereof is a convex surface, while an image-side surface S2 is a concave surface. The second lens E2 has a negative refractive power, an object-side surface S3 thereof is a convex surface, while an image-side surface S4 is a concave surface. The third lens E3 has a positive refractive power, an object-side surface S5 thereof is a convex surface, while an image-side surface S6 is a convex surface. The fourth lens E4 has a negative refractive power, an object-side surface S7 thereof is a convex surface, while an image-side surface S8 is a concave surface. The fifth lens E5 has a positive refractive power, an object-side surface S9 thereof is a concave surface, while an image-side surface S10 is a convex surface. The sixth lens E6 has a negative refractive power, an object-side surface S11 thereof is a concave surface, while an image-side surface S12 is a concave surface. The optical filter E7 has an object-side surface S13 and an image-side surface S14. The optical imaging lens assembly has an imaging surface S15. Light from an object sequentially penetrates through each of the surfaces S1 to S14 and is finally imaged on the imaging surface S15.

In embodiment 6, a value of a total effective focal length f of the optical imaging lens assembly is 8.92 mm, TTL is an on-axis distance from the object-side surface S1 of the first lens E1 to the imaging surface S15, a value of TTL is 10.72 mm, and a value of ImgH (ImgH is a half of a diagonal length of an effective pixel region on the imaging surface S15) is 2.65 mm.

Table 11 shows a basic parameter table of the optical imaging lens assembly of embodiment 6, and units of the curvature radius, the thickness/distance and the focal length are all millimeter (mm). Table 12 shows high-order coefficients that can be used for each of aspheric mirror surfaces in embodiment 6. A surface type of each aspheric surface may be defined by the formula (1) given in embodiment 1.

TABLE 11

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −1.5394 | | | | |
| S1 | Aspheric | 4.7111 | 1.5972 | 1.54 | 56.1 | 13.77 | 0.0000 |
| S2 | Aspheric | 11.1186 | 0.1804 | | | | 0.0000 |
| S3 | Aspheric | 5.3646 | 0.5023 | 1.68 | 19.2 | −24.02 | 0.0000 |
| S4 | Aspheric | 3.8823 | 0.1019 | | | | 0.0000 |
| S5 | Aspheric | 3.8755 | 1.8095 | 1.54 | 56.1 | 6.88 | 0.0000 |
| S6 | Aspheric | −99.0000 | 0.5947 | | | | 0.0000 |
| S7 | Aspheric | 4.6661 | 0.4864 | 1.67 | 20.4 | −7.20 | 0.0000 |
| S8 | Aspheric | 2.2683 | 1.7170 | | | | 0.0000 |
| S9 | Aspheric | −99.0000 | 1.1892 | 1.68 | 19.2 | 7.10 | 0.0000 |
| S10 | Aspheric | −4.6080 | 0.2966 | | | | 0.0000 |
| S11 | Aspheric | −42.3551 | 1.3191 | 1.68 | 19.2 | −6.15 | 0.0000 |
| S12 | Aspheric | 4.6832 | 0.4009 | | | | 0.0000 |
| S13 | Spherical | Infinite | 0.2100 | 1.52 | 64.2 | | |
| S14 | Spherical | Infinite | 0.3149 | | | | |
| S15 | Spherical | Infinite | | | | | |

TABLE 12

| Surface number | A4 | A6 | A8 | A10 | A12 |
|---|---|---|---|---|---|
| S1 | −6.6631E−04 | −8.1899E−05 | 8.1485E−05 | −6.7365E−05 | 3.1903E−05 |
| S2 | 8.7199E−03 | −5.2953E−03 | 1.2431E−03 | 1.3395E−05 | −1.0182E−04 |
| S3 | 1.7442E−02 | −9.1541E−03 | 3.1990E−03 | −1.1370E−03 | 4.9094E−04 |
| S4 | 2.2521E−02 | −1.4316E−02 | 7.9697E−03 | −5.0878E−03 | 2.8349E−03 |
| S5 | 1.3116E−02 | −9.6364E−03 | 5.2592E−03 | −3.0205E−03 | 1.4373E−03 |
| S6 | 2.2026E−03 | 8.0884E−05 | −9.7746E−04 | 9.6991E−04 | −6.5378E−04 |
| S7 | −2.3195E−02 | 2.8061E−03 | 1.4386E−03 | −4.1164E−03 | 5.2430E−03 |

TABLE 12-continued

| | | | | | |
|---|---|---|---|---|---|
| S8 | −3.5637E−02 | 2.7457E−03 | 5.2152E−03 | −1.6381E−02 | 2.6627E−02 |
| S9 | −1.2255E−02 | −1.1475E−03 | −5.1074E−03 | 1.5291E−02 | −2.9655E−02 |
| S10 | −2.9939E−02 | 1.3906E−02 | −1.6766E−03 | −7.9974E−03 | 1.2106E−02 |
| S11 | −5.0432E−02 | 2.2038E−02 | −9.3641E−04 | −9.4854E−03 | 1.2277E−02 |
| S12 | −4.2133E−02 | 1.6127E−02 | −1.2038E−02 | 1.2108E−02 | −1.0154E−02 |

| Surface number | A14 | A16 | A18 | A20 |
|---|---|---|---|---|
| S1 | −9.7734E−06 | 2.0547E−06 | −3.0606E−07 | 3.2682E−08 |
| S2 | 3.3803E−05 | −6.2061E−06 | 7.4400E−07 | −6.0954E−08 |
| S3 | −1.8753E−04 | 5.1118E−05 | −9.6047E−06 | 1.2516E−06 |
| S4 | −1.1110E−03 | 2.8951E−04 | −4.9377E−05 | 5.2933E−06 |
| S5 | −4.4327E−04 | 6.9948E−05 | 1.1765E−06 | −2.9589E−06 |
| S6 | 3.2238E−04 | −1.1570E−04 | 3.0097E−05 | −5.6472E−06 |
| S7 | −4.2096E−03 | 2.3097E−03 | −8.9529E−04 | 2.4777E−04 |
| S8 | −2.8384E−02 | 2.0947E−02 | −1.0972E−02 | 4.1102E−03 |
| S9 | 3.7667E−02 | −3.2873E−02 | 2.0211E−02 | −8.8341E−03 |
| S10 | −1.0700E−02 | 6.5684E−03 | −2.9018E−03 | 9.2702E−04 |
| S11 | −9.8440E−03 | 5.6113E−03 | −2.3321E−03 | 7.0746E−04 |
| S12 | 6.1677E−03 | −2.6899E−03 | 8.4855E−04 | −1.9397E−04 |

Figure 12A:
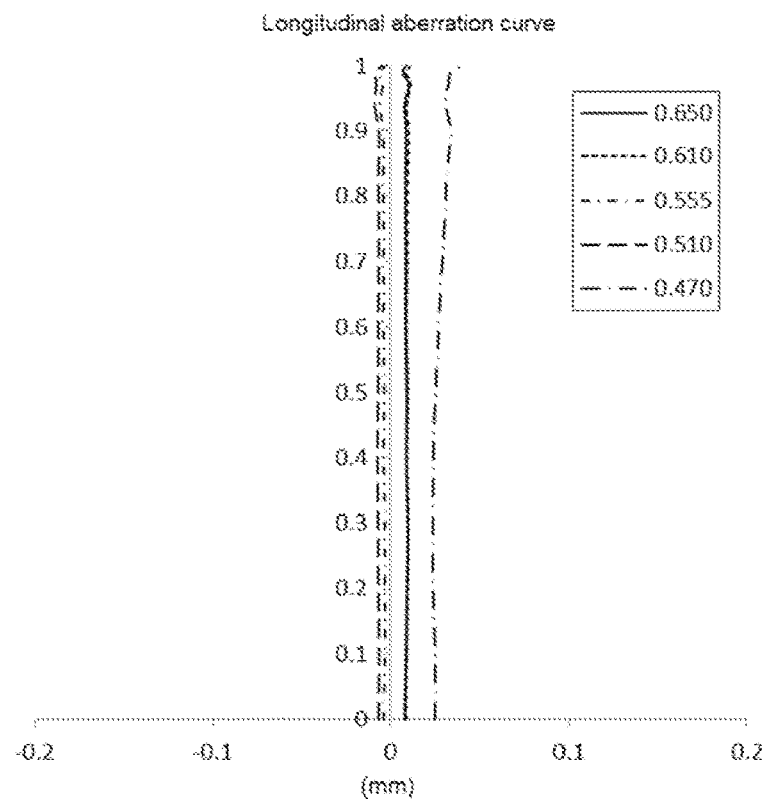
FIG. 12A to FIG. 12D show a longitudinal aberration curve, an astigmatism curve, a distortion curve and a lateral color curve of an optical imaging lens assembly according to embodiment 6 respectively.
Figure 12B:
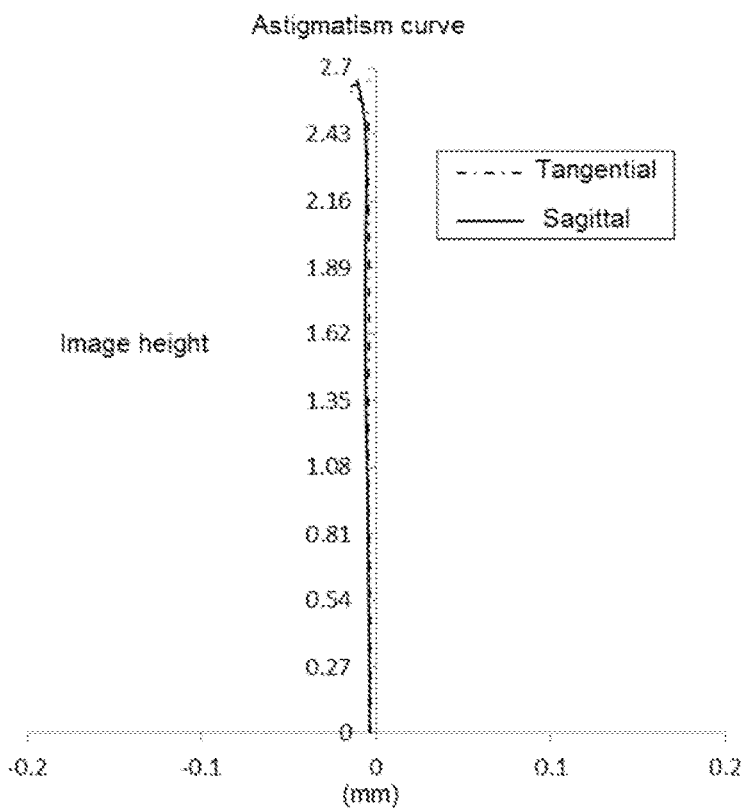
Figure 12C:
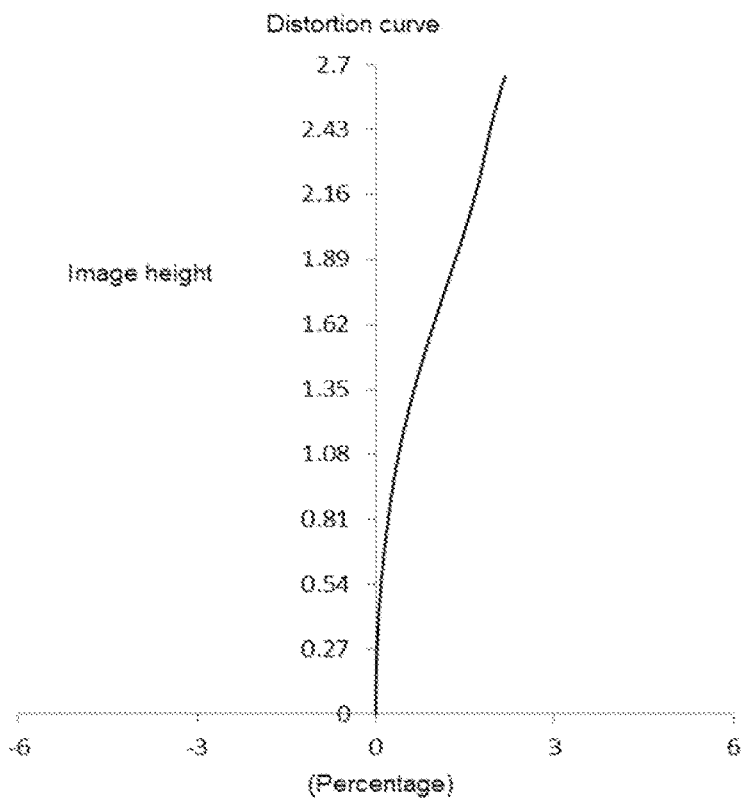
Figure 12D:
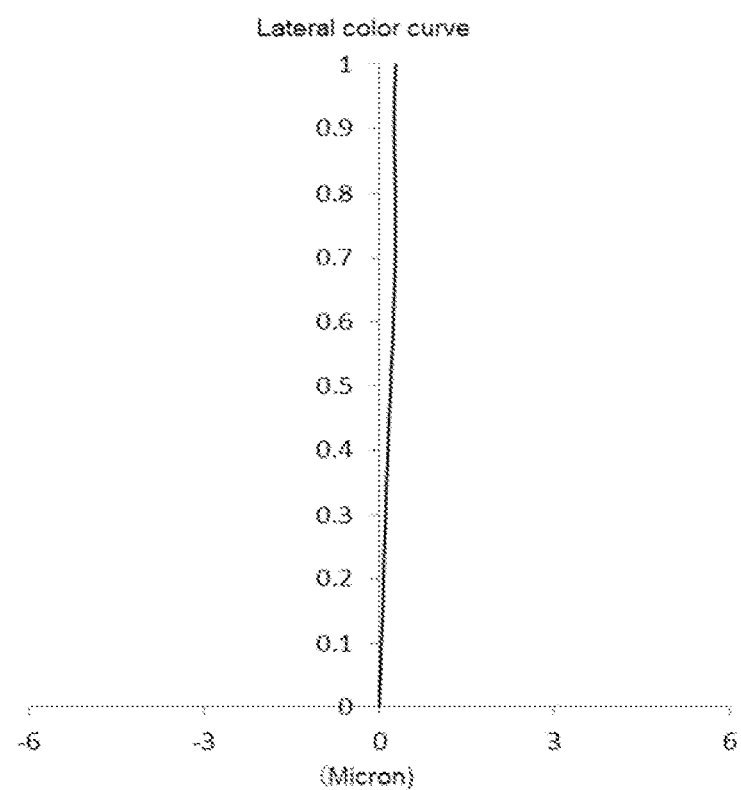

FIG. 12A shows a longitudinal aberration curve of the optical imaging lens assembly according to embodiment 6 to represent deviation of a convergence focal point after light with different wavelengths passes through the lens. FIG. 12B shows an astigmatism curve of the optical imaging lens assembly according to embodiment 6 to represent a tangential image surface curvature and a sagittal image surface curvature. FIG. 12C shows a distortion curve of the optical imaging lens assembly according to embodiment 6 to represent distortion values corresponding to different image heights. FIG. 12D shows a lateral color curve of the optical imaging lens assembly according to embodiment 6 to represent deviation of different image heights on the imaging surface after the light passes through the lens. According to FIG. 12A to FIG. 12D, it can be seen that the optical imaging lens assembly provided in embodiment 6 may achieve high imaging quality.

From the above, embodiment 1 to embodiment 6 meet a relationship shown in Table 13 respectively.

TABLE 13

| Conditional expression/embodiment | 1 | 2 | 3 | 4 | 5 | 6 |
|---|---|---|---|---|---|---|
| f/EPD | 1.03 | 1.05 | 1.10 | 1.30 | 1.20 | 1.16 |
| (f3 + f5)/f1 | 1.61 | 1.20 | 1.14 | 1.11 | 0.96 | 1.01 |
| (f4 + f6)/f2 | 1.60 | 0.91 | 0.86 | 0.81 | 0.56 | 0.56 |
| (R2 − R1)/f | 1.26 | 0.96 | 0.91 | 0.88 | 0.63 | 0.72 |
| R3/R4 | 1.74 | 1.56 | 1.54 | 1.53 | 1.39 | 1.38 |
| (R7 + R8)/(R7 − R8) | 4.94 | 3.52 | 3.40 | 3.28 | 2.68 | 2.89 |
| (CT4 + T45)/(CT5 + T56) | 1.23 | 1.19 | 1.18 | 1.18 | 1.31 | 1.48 |
| DT11/DT31 | 1.38 | 1.36 | 1.36 | 1.32 | 1.26 | 1.25 |
| DT12/(DT61 + DT62) | 0.86 | 0.85 | 0.81 | 0.67 | 0.75 | 0.79 |
| CT1/(CT2 + CT3) | 1.12 | 0.92 | 0.91 | 0.90 | 0.77 | 0.69 |
| f23/TTL | 3.09 | 1.36 | 1.27 | 1.21 | 0.89 | 0.94 |
| SAG22/SAG31 | 0.99 | 0.97 | 0.98 | 1.00 | 1.03 | 1.02 |
| SAG41/SAG61 | −0.79 | −1.83 | −1.44 | −1.12 | −0.78 | −1.01 |

The disclosure also provides an imaging device, which is provided with an electronic photosensitive element for imaging. The electronic photosensitive element may be a Charge Coupled Device (CCD) or a Complementary Metal Oxide Semiconductor (CMOS). The imaging device may be an independent imaging device such as a digital camera, and may also be an imaging module integrated into a mobile electronic device such as a mobile phone. The imaging device is provided with the abovementioned optical imaging lens assembly.

The above description is only description about the preferred embodiments of the disclosure and adopted technical principles. It is understood by those skilled in the art that the scope of protection involved in the disclosure is not limited to the technical solutions formed by specifically combining the technical characteristics and should also cover other technical solutions formed by freely combining the technical characteristics or equivalent characteristics thereof without departing from the concept of the disclosure, for example, technical solutions formed by mutually replacing the characteristics and (but not limited to) the technical characteristics with similar functions disclosed in the disclosure.

What is claimed is:

1. An optical imaging lens assembly, sequentially comprising, from an object side to an image side along an optical axis:
a first lens with a positive refractive power;
a second lens;
a third lens with a positive refractive power;
a fourth lens;
a fifth lens with a positive refractive power; and
a sixth lens with a negative refractive power,
wherein a total effective focal length f of the optical imaging lens assembly and an entrance pupil diameter (EPD) of the optical imaging lens assembly meet:

$f/EPD < 1.35$; and an effective focal length f3 of the third lens, an effective focal length f5 of the fifth lens and an effective focal length f1 of the first lens meet:

$0.9 < (f3+f5)/f1 < 1.7$.

2. The optical imaging lens assembly according to claim 1, wherein an effective focal length f4 of the fourth lens, an effective focal length f6 of the sixth lens and an effective focal length f2 of the second lens meet:

$0.5<(f4+f6)/f2<1.7$.

3. The optical imaging lens assembly according to claim 1, wherein a curvature radius R2 of an image-side surface of the first lens, a curvature radius R1 of an object-side surface of the first lens and the total effective focal length f of the optical imaging lens assembly meet:

$0.6<(R2-R1)/f<1.3$.

4. The optical imaging lens assembly according to claim 1, wherein a curvature radius R3 of an object-side surface of the second lens and a curvature radius R4 of an image-side surface of the second lens meet:

$1.3<R3/R4<1.8$.

5. The optical imaging lens assembly according to claim 1, wherein a curvature radius R7 of an object-side surface of the fourth lens and a curvature radius R8 of an image-side surface of the fourth lens meet:

$2.6<(R7+R8)/(R7-R8)<5.0$.

6. The optical imaging lens assembly according to claim 1, wherein a center thickness CT4 of the fourth lens on the optical axis, a spacing distance T45 of the fourth lens and the fifth lens on the optical axis, a center thickness CT5 of the fifth lens on the optical axis and a spacing distance T56 of the fifth lens and the sixth lens on the optical axis meet:

$1.0<(CT4+T45)/(CT5+T56)<1.5$.

7. The optical imaging lens assembly according to claim 1, wherein an effective radius DT11 of an object-side surface of the first lens and an effective radius DT31 of an object-side surface of the third lens meet:

$1.2 \leq DT11/DT31<1.5$.

8. The optical imaging lens assembly according to claim 1, wherein an effective radius DT12 of an image-side surface of the first lens, an effective radius DT61 of an object-side surface of the sixth lens and an effective radius DT62 of an image-side surface of the sixth lens meet:

$0.6<DT12/(DT61+DT62)<0.9$.

9. The optical imaging lens assembly according to claim 1, wherein a center thickness CT1 of the first lens on the optical axis, a center thickness CT2 of the second lens on the optical axis and a center thickness CT3 of the third lens on the optical axis meet:

$0.6<CT1/(CT2+CT3)<1.2$.

10. The optical imaging lens assembly according to claim 1, wherein TTL is a distance from an object-side surface of the first lens to an imaging surface on the optical axis, a combined focal length f23 of the second lens and the third lens and TTL meet:

$0.8<f23/TTL<3.1$.

11. The optical imaging lens according to claim 1, wherein SAG22 is an on-axis distance from an intersection point of an image-side surface of the second lens and the optical axis to an effective radius vertex of the image-side surface of the second lens, and SAG31 is an on-axis distance from an intersection point of an object-side surface of the third lens and the optical axis to an effective radius vertex of the object-side surface of the third lens, SAG22 and SAG31 meet:

$0.9<SAG22/SAG31<1.3$.

12. The optical imaging lens assembly according to claim 1, wherein SAG41 is an on-axis distance from an intersection point of an object-side surface of the fourth lens and the optical axis to an effective radius vertex of the object-side surface of the fourth lens, and SAG61 is an on-axis distance from an intersection point of an object-side surface of the sixth lens and the optical axis to an effective radius vertex of the object-side surface of the sixth lens, SAG41 and SAG61 meet:

$-1.9<SAG41/SAG61<-0.7$.

* * * * *